United States Patent
Naohara et al.

(10) Patent No.: US 8,906,574 B2
(45) Date of Patent: Dec. 9, 2014

(54) FUEL CELL MEMBRANE-ELECTRODE ASSEMBLY AND PRODUCTION METHOD THEREFOR

(75) Inventors: Hideo Naohara, Sunto-gun (JP); Yuichi Orikasa, Susono (JP); Manabu Kato, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 710 days.

(21) Appl. No.: 12/295,796

(22) PCT Filed: Mar. 22, 2007

(86) PCT No.: PCT/IB2007/000733
§ 371 (c)(1),
(2), (4) Date: Oct. 2, 2008

(87) PCT Pub. No.: WO2007/119132
PCT Pub. Date: Oct. 25, 2007

(65) Prior Publication Data
US 2009/0162721 A1    Jun. 25, 2009

(30) Foreign Application Priority Data
Apr. 14, 2006   (JP) .................................. 2006-111838

(51) Int. Cl.
| | | |
|---|---|---|
| H01M 4/88 | (2006.01) | |
| H01M 4/92 | (2006.01) | |
| H01M 8/10 | (2006.01) | |
| H01M 4/86 | (2006.01) | |

(52) U.S. Cl.
CPC ............ *H01M 4/886* (2013.01); *H01M 4/8828* (2013.01); *H01M 4/92* (2013.01); *Y02E 60/50* (2013.01); *H01M 4/881* (2013.01); *H01M 4/8673* (2013.01); *H01M 4/928* (2013.01); *H01M 4/8668* (2013.01)
USPC ........... 429/487; 429/444; 502/325; 502/326; 29/623.5

(58) Field of Classification Search
USPC ........... 429/444, 487; 29/623.5; 502/325, 326
IPC ...................................... H01M 8/10,4/92, 4/88
See application file for complete search history.

(56) References Cited

U.S. PATENT DOCUMENTS 4,478,917 A    10/1984 Fujita et al.
4,524,114 A *   6/1985 Samuels et al. ............... 429/505
(Continued)

FOREIGN PATENT DOCUMENTS

| CN | 1244050 A | 2/2000 | | |
|---|---|---|---|---|
| JP | 62154464 A * | 7/1987 | .............. | H01M 4/86 |

(Continued)

OTHER PUBLICATIONS

Cheng (Characterization of catalysts and membrane in DMFC lifetime testing, Electrochimica Acta, 2006, 51:4620-4625).*

(Continued)

*Primary Examiner* — Jun Li
(74) *Attorney, Agent, or Firm* — Kenyon & Kenyon LLP

(57) ABSTRACT

A fuel cell membrane-electrode assembly having a fuel electrode and an oxidant electrode has a non-supported-catalyst containing catalyst layer that contains a metal catalyst nanoparticle of 0.3 nm to 100 nm in primary particle diameter that is not supported on a support, and an electrochemically active surface area of the metal catalyst nanoparticle is 10 $m^2/g$ to 150 $m^2/g$, and a layer thickness of the non-supported-catalyst containing catalyst layer is less than or equal to 10 μm.

13 Claims, 8 Drawing Sheets

(56) References Cited

U.S. PATENT DOCUMENTS

| | | | |
|---|---|---|---|
| 5,547,911 | A | 8/1996 | Grout |
| 5,716,437 | A | 2/1998 | Denton et al. |
| 6,069,107 | A * | 5/2000 | Kuznetsov et al. ............ 502/101 |
| 6,319,293 | B1 * | 11/2001 | Debe et al. .................... 29/623.3 |
| 2001/0018145 | A1 | 8/2001 | Datz et al. |
| 2002/0037449 | A1 | 3/2002 | Binder et al. |
| 2003/0044673 | A1 | 3/2003 | Fukuda et al. |
| 2003/0190517 | A1 * | 10/2003 | Elter et al. ....................... 429/42 |
| 2004/0013935 | A1 | 1/2004 | Ye et al. |
| 2004/0038808 | A1 * | 2/2004 | Hampden-Smith et al. ... 502/180 |
| 2004/0106034 | A1 * | 6/2004 | Bekkedahl et al. .............. 429/44 |
| 2007/0026294 | A1 | 2/2007 | Shimazaki et al. |
| 2007/0163612 | A1 * | 7/2007 | Miser et al. .................... 131/364 |
| 2009/0029216 | A1 * | 1/2009 | Yamamoto ....................... 429/30 |

FOREIGN PATENT DOCUMENTS

| | | |
|---|---|---|
| JP | 08-259873 A | 10/1996 |
| JP | 09-510571 A | 10/1997 |
| JP | 10507305 A | 7/1998 |
| JP | 10507305 A | 7/1998 |
| JP | 11-111305 A | 4/1999 |
| JP | 2002-151088 A | 5/2002 |
| JP | 2002-525812 A | 8/2002 |
| JP | 2003-508877 A | 3/2003 |
| JP | 2004-022503 A | 1/2004 |
| JP | 2004-139899 A | 5/2004 |
| JP | 2004-288388 A | 10/2004 |
| JP | 2005522015 A | 7/2005 |
| JP | 2005-294264 A | 10/2005 |
| JP | 2005276688 A | 10/2005 |
| JP | 2005276688 A | 10/2005 |
| JP | 2006-004662 A | 1/2006 |
| JP | 2006-012476 A | 1/2006 |
| JP | 2006-185855 A | 7/2006 |
| JP | 08259873 A | 10/2008 |
| JP | 2008259873 A | 10/2008 |
| WO | WO 01/15247 A2 | 3/2001 |
| WO | 03/088388 A1 | 10/2003 |
| WO | 03088402 A1 | 10/2003 |

OTHER PUBLICATIONS

Machine translation of Terasono (JP11-111305).*

English translation of JP62154464, published date Jul. 9, 1987.*

Cheng et al.: *Characterization of catalysts and membrane in DMFC lifetime testing*, Electrochimica Acta, Elsevier Science Publishers, Barking, GB, vol. 51, No. 22, Mar. 23, 2006, pp. 4620-4625.

Lim et al.: *Effect of dispersion methods of an unsupported Pt-Ru black anode catalyst on the power performance of a direct methanol fuel cell*, Journal of Power Sources, Elsevier, Amsterdam, NL, vol. 161, No. 1, Oct. 20, 2006, pp. 11-18.

*Handbook of Fuel Cells—Fundamentals Technology and Applications*: vol. 4, Fuel Cell Technology and Applications: Part 2, John Wiley & Sons, 2003, p. 813.

Office Action issued Jul. 20, 2011 in CN Application No. 200780012526.X and English translation thereof.

Office Action issued Mar. 21, 2012 in JP 2006-111838 and English translation thereof.

\* cited by examiner

FUEL CELL MEMBRANE-ELECTRODE ASSEMBLY AND PRODUCTION METHOD THEREFOR

This is a 371 national phase application of PCT/IB2007/000733 filed 22 Mar. 2007, claiming priority to Japanese Patent Application No. 2006-111838 filed 14 Apr. 2006, the contents of which are incorporated herein by reference.

BACKGROUND OF THE INVENTION

1. Field of the Invention

The invention relates to a fuel cell membrane-electrode assembly and a production method therefor.

2. Description of the Related Art

Fuel cells directly convert chemical energy into electric energy by supplying a fuel and an oxidant to two electrically connected electrodes and electrochemically causing oxidation of the fuel. Unlike thermal power plants, the fuel cells are free from the restrictions of the Carnot cycle, and exhibit high energy-conversion efficiency. Ordinarily, the fuel cells are constructed by stacking a plurality of unit cells that have, as a basic structure, a membrane-electrode assembly formed by sandwiching an electrolyte membrane between a pair of electrodes. In particular, a solid polymer electrolyte fuel cell incorporating a solid polymer electrolyte membrane as an electrolyte membrane is drawing attention particularly as a portable power source or a power source of mobile bodies due to its advantages of being easy to miniaturize, being operable at low temperature, etc.

During the normal power generation of a solid polymer electrolyte fuel cell that uses hydrogen as a fuel and oxygen as an oxidant, the reaction of the formula (1) progresses at a fuel electrode (anode).

$$2H_2 \rightarrow 4H^+ + 4e^- \tag{1}$$

The electrons generated in the reaction of the formula (1) move through an external circuit, and reach the oxidant electrode (cathode) after working in a load provided outside. The protons generated in the reaction of the formula (1) move in a water-hydrated state within a solid polymer electrolyte membrane from the fuel electrode side to the oxidant electrode side.

At the oxidant electrode, on the other hand, the reaction of the formula (2) progresses.

$$4H^+ + O_2 + 4e^- \rightarrow 2H_2O \tag{2}$$

That is, as the whole cell, the following reaction progresses.

$$2H_2 + O_2 \rightarrow 2H_2O \tag{3}$$

In order to accelerate the reactions of the formulas (1) or (2), each of the electrodes, that is, the fuel electrode and the oxidant electrode, is provided with an electrode catalyst. Generally, an electrode catalyst has a construction in which a catalytically active substance, such as a metal catalyst particle or the like, including particles of platinum, a platinum alloy, etc., is supported on an electrically conductive material such as a carbon particle or the like. Metal catalysts, such as platinum or the like, that are used as electrode catalysts are very expensive. In order to put fuel cells into practical use, there is a demand for development of a fuel cell in which the utilization rate of the catalyst is improved so as to exhibit excellent power generating performance while minimizing the amount of the catalyst that needs to be employed.

Examples of the method of improving the utilization rate of the metal catalyst include the particle size reduction of the metal catalyst particle. By reducing the particle diameter of the metal catalyst particle, the exposed surface area of the metal catalyst increases if the amount of the metal catalyst employed remains the same. In this manner, the utilization rate of the metal catalyst can be heightened. However, small metal catalyst particles are difficult to disperse, and very easily aggregate. Therefore, the particle size reduction finds it difficult to effectively increase the exposed surface area. It is known that the particle diameter of platinum particles supported on carbon particles is generally about 2 to 3 nm.

The reactions of the formula (1) and the formula (2) progress at a three-phase interface where reactant gases, that is, the fuel and the oxidant, that is, protons ($H^+$) and electrons ($e^-$), can be given and received. That is, it is important to dispose the catalytically active substance near the three-phase interface in order to improve the catalyst utilization rate. For example, Japanese Patent Application Publication No. JP-A-2002-151088 describes a technology of efficiently forming places of reaction where the electrode reactions progress and therefore improving the utilization rate of platinum through the use of a catalyst ink that has been prepared by dispersing platinum black in a solution that contains a fluorine-containing ion exchange resin and a fluorine-containing compound solvent so that the viscosity of the solution is 100 to 20,000 cP.

As described above, a metal catalyst, such as platinum or the like, is ordinarily incorporated in such a fashion that the metal catalyst is supported on an electrically conductive particle, such as a carbon support or the like including a carbon particle or the like. The catalyst layer formed by using such a catalyst-supporting carbon particle becomes a thick layer corresponding to the bulk height of the carbon particle. Most reactions occurring at the catalyst layer progress on the metal catalyst that is present near the interface between the electrolyte membrane and the catalyst layer or present near the interface between the catalyst layer and the gas diffusion layer. Therefore, on a thick catalyst layer as mentioned above, the catalyst utilization rate tends to be very low, that is, the amount of the metal catalyst effectively contributing to the electrode reactions is ⅓ to ½ of the amount of catalytically active substance contained in the catalyst layer. This is because in a thick catalyst layer, the diffusion of the reactant gas, protons and electrons is likely to be impeded.

Therefore, in some cases, a metal catalyst particle, such as platinum black or the like, is not supported on a support, such as carbon particle or the like, but is simply employed. However, such a support-less metal catalyst particle very easily aggregates, depending on the particle diameter thereof. Thus, it is very difficult to form a catalyst layer in which a metal catalyst particle is highly dispersed.

JP-A-2002-151088, mentioned above, teaches that the state of aggregation of the platinum black particle can be stabilized in a desired state by adjusting the viscosity of the catalyst ink containing a fluorine-containing ion exchange resin, a fluorine-containing compound solvent and platinum black, within the range of 100 to 20,000 cP. However, although JP-A-2002-151088 teaches that a preferable particle diameter of the platinum black is 0.01 to 30 μm, the particle diameter of the platinum black actually used in a working example is 3 μm. Such a large-particle diameter platinum black may be able to be dispersed to a high degree, but is not able to sufficiently improve the catalyst utilization rate due to its small surface area. Furthermore, the ratio between the platinum black and the fluorine-containing ion exchange resin recommended in JP-A-2002-151088 (platinum black: fluorine-containing ion exchange resin=0.2:0.8 to 0.9:0.1 (mass ratio)) may suffer from large catalyst layer resistance and therefore decline of the cell output because the amount of fluorine-containing ion exchange resin is rather large. Furthermore, in this technology, it is sometimes difficult to fabricate electrodes where the electrode reactions efficiently progress.

Besides, the use of a support-less metal catalyst particle has a merit of being free of the oxidation corrosion of the carbon support in a state where the fuel is lacking and free of the various problems resulting from the oxidation corrosion of the carbon support. The carbon material, such as carbon particle or the like, that is used as a catalyst support that supports metal catalyst particles is a material that has such a large surface area as to support many metal catalyst particles. Generally, the carbon material having large surface area (generally, 300 m$^2$/g or greater) which is used as a catalyst support as mentioned above is low in oxidation corrosion resistance.

It is known that the cell characteristic declines if a state where the fuel, such as hydrogen or the like, becomes lacking (hereinafter, referred to as "fuel deficiency") occurs due to some cause, for example, the closure of a gas channel, flooding, etc. In a unit cell where abnormality has occurred in the state of supply of the fuel and therefore fuel deficiency has occurred, the protons and the electrons produced by the oxidation of the fuel become insufficient. In order to make up for the insufficient protons and electrons, the electrolysis of water present in the fuel electrode or water held in the electrolyte membrane or the oxidant electrode ($H_2O \rightarrow 2H^+ + 2e^- + \frac{1}{2}O_2$) progresses in this unit cell. At this time, the electrical potential of the fuel electrode of the unit cell rises to the electrolytic potential of water, resulting in a reversed potential state in which the electrical potential of the fuel electrode (anode) and the electrical potential of the oxidant electrode (cathode) are reversed.

The electrical potential of the fuel electrode remains stable as long as protons and electrons are sufficiently supplied by the electrolysis of water at the fuel electrode. However, when sufficient supply of protons and electrons is not secured only through the electrolysis of water, the electrical potential of the fuel electrode further rises so that the oxidative reaction of the carbon material that constitutes the electrode ($C + 2H_2O \rightarrow CO_2 + 4H^+ + 4e^-$) occurs, supplying electrons and protons. This oxidation corrosion of the carbon material decomposes and depletes the carbon material.

The decomposition, depletion or the like of the carbon material that is an electrically conductive material lowers the electrical conductivity, and causes increased resistance due to bad contact. Besides, the decomposition, depletion or the like of the carbon material that is a water-repellent material lower the water repellency of the cell, and facilitates the occurrence of the flooding, which inhibits the supply of the reactant gas. Furthermore, due to the decomposition or depletion of the carbon material supporting the metal catalyst particle, metal catalyst particles fall apart or move, so that the effective catalyst surface area decreases. Thus, due to the oxidation corrosion of the carbon material, the power generation performance of the fuel cell considerably declines, and stable power generation performance cannot be delivered.

Furthermore, even if the fuel deficiency state is resolved, there may occur a case where during the transition from the fuel deficiency state to a normal power generating state, a partial cell reaction caused by non-uniform distribution of the fuel on the fuel electrode side results in a local high electrical potential on the oxidant electrode. In consequence, the oxidation corrosion of the carbon material occurs on the oxidant electrode side as well, and concomitantly various problems as mentioned above occur on the oxidant electrode side as well.

Because the oxidation of the carbon material in the fuel electrode and the oxidant electrode as mentioned above is a irreversible reaction, the resolution of the fuel deficiency will not bring the performance of the fuel cell back to the state preceding the fuel deficiency. Examples of the technologies for solving problems resulting from the fuel deficiency state include a technology described in Published Japanese Translation of PCT Application, JP-T-2003-508877, a technology described in JP-A-2004-22503, etc.

Furthermore, the carbon material has catalytic activity for the reaction that produces hydrogen peroxide from oxygen and hydrogen. Therefore, hydrogen peroxide is sometimes produced from oxygen and hydrogen, depending on the state within the fuel cell. Hydrogen peroxide produces radicals, a strong oxidant, and thus degrades a cell-constituting material such as the electrolyte resin, and the like.

It is considered that these problems arising from the carbon material will be able to be prevented by incorporating a catalytically active substance without supporting it on carbon particle. For example, JP-A-2005-294264 proposes a membrane-electrode assembly having a cathode catalyst layer that contains a mixture of platinum black, and platinum supported on a carbon support, for the purpose of restraining the corrosion of the carbon support and the accompanying decline of the catalyst performance.

Besides, Published Japanese Translation of PCT Application, JP-T-2002-525812, proposes an electrode produced by using a screen printing paste that contains platinum black, a binder polymer and a high boiling point solvent. However, because the screen printing paste is required to have high boiling point and high viscosity, small-particle diameter platinum black is likely to thermally aggregate in the paste. Therefore, in the case where small platinum black particles in the nano-size are incorporated in a non-supported state, the utilization rate thereof as a catalyst is likely to decline.

SUMMARY OF THE INVENTION

It is a first object of the invention to improve the catalyst utilization rate in a fuel cell membrane-electrode assembly. Furthermore, it is a second object of the invention to restrain the decline of the durability of a fuel cell caused by the oxidation corrosion of a support that supports a catalyst.

A fuel cell membrane-electrode assembly of a first aspect of the invention relates to a fuel cell membrane-electrode assembly that has a fuel electrode at one surface side of an electrolyte membrane, and an oxidant electrode at another surface side of the electrolyte membrane. In this fuel cell membrane-electrode assembly, at least one of the fuel electrode and the oxidant electrode has a non-supported-catalyst containing catalyst layer that contains a metal catalyst nanoparticle of 0.3 nm to 100 nm in primary particle diameter that is not supported on a support, and an electrochemically active surface area of the metal catalyst nanoparticle is 10 m$^2$/g to 150 m$^2$/g, and a layer thickness of the non-supported-catalyst containing catalyst layer is less than or equal to 10 μm.

Because the fuel cell membrane-electrode assembly of this aspect contains a metal catalyst nanoparticle as small as 0.3 to 100 nm in a state where the metal catalyst nanoparticle is not supported on a support, such as a carbon particle or the like, but is highly dispersed, the electrochemically active surface area thereof is as large as 10 m$^2$/g to 150 m$^2$/g. Furthermore, because the metal catalyst nanoparticle is not supported on a support, the catalyst layer can be made very thin, and therefore a catalytically active component can be disposed in high density at an interface between the electrolyte membrane and the catalyst layer where the electrode reactions particularly readily progress. Hence, the utilization rate of the metal catalyst is high.

Furthermore, because the metal catalyst is concentrated to the interface between the electrolyte membrane and the electrode in association with the layer thickness reduction of the catalyst layer, the proton conductivity between the membrane and the electrode can be improved, and the electric conductivity and the gas diffusivity of the catalyst layer can also be improved. Because metal catalyst nanoparticles make metal contacts with one another, an additional benefit is that the electrical resistance of the catalyst layer is also reduced.

Furthermore, the construction in which a carbon material, such as a carbon particle or the like, is not used as a catalyst support restrains the oxidation corrosion of the catalyst support carbon material in the fuel electrode at the time of fuel deficiency or in the oxidant electrode at the time of abnormal electrical potential associated with the occurrence of a partial cell state. Hence, it is possible to restrain occurrence of various problems associated with the oxidation corrosion of a carbon material, such as the decline in the electrical conductivity or the water repellency of the electrodes, the decline in the catalyst utilization rate due to the moving or falling apart of metal catalyst nanoparticles, the electrode thinning, and the like.

Still further, because a carbon support that has catalytic activity for the production of hydrogen peroxide is not used, the production of highly oxidative radicals from hydrogen peroxide can be restrained, and therefore degradation of cell-constituting materials, such as the electrolyte membrane or the like, can be prevented.

As for the metal catalyst nanoparticle, the primary particle diameter may be 5 nm to 10 nm, from the viewpoint of the exposed surface area, dispersibility, elution characteristic, etc.

Besides the layer thickness of the non-supported-catalyst containing catalyst layer may be less than or equal to 5 μm, from the viewpoint of concentrating the metal catalyst nanoparticles to the interface between the electrolyte membrane and the electrode.

Preferable examples of the metal catalyst nanoparticle include a platinum particle.

The non-supported-catalyst containing catalyst layer may further contain a water-repellent particle from the view point of prevention of flooding. The water-repellent particle may be a carbon particle whose surface area is 5 to 200 $m^2/g$. The carbon particle as the water-repellent particle may be a highly crystallized carbon from the viewpoint of oxidation corrosion resistance.

An amount of the metal catalyst nanoparticle per unit area of the non-supported-catalyst containing catalyst layer may be 0.001 to 10 $mg/cm^2$. Besides, the non-supported-catalyst containing catalyst layer may further contain an electrolyte resin.

Besides, in order to restrain flooding, it is possible to form a structure in which at least one of the fuel electrode and the oxidant electrode may have a catalyst layer having a multi-layer structure in which a first catalyst layer made of the non-supported-catalyst containing catalyst layer, and a second catalyst layer that contains an electrolyte resin and a supported catalyst particle formed by supporting a catalyst on a carbon particle whose surface area is 5 to 200 $m^2/g$, in that order from a side of the electrolyte membrane.

In this case, the layer thickness of the second catalyst layer may be less than or equal to 50 μm. Besides, the amount of catalyst per unit area of the second catalyst layer may be 0.001 to 0.5 $mg/cm^2$. In particular, the amount of catalyst per unit area of the entire catalyst layer that includes the first catalyst layer and the second catalyst layer may be 0.001 to 10 $mg/cm^2$. In this catalyst layer construction, the water produced in the first catalyst layer can be absorbed in the second catalyst layer, so that the flooding can be restrained.

Incidentally, a bulk density of the metal catalyst nanoparticle is 0.1 $g/cm^3$ to 21.37 $g/cm^3$.

A second aspect of the invention relates to a production method for a fuel cell membrane-electrode assembly that has a first electrode at one surface side of an electrolyte membrane, and an oxidant electrode at another surface side of the electrolyte membrane. In this method, a non-supported-catalyst containing catalyst layer is formed as a catalyst layer that is included in at least one of a side of the fuel electrode and a side of the oxidant electrode by using a catalyst ink that contains a metal catalyst nanoparticle of 0.3 nm to 100 nm in primary particle diameter which is not supported on a support, an electrolyte resin, and a water-based solvent. The use of this catalyst ink makes it possible to manufacture a fuel cell membrane-electrode assembly in which the metal catalyst nanoparticle is highly dispersed within the catalyst layer so that the electrochemically active surface area is 10 $m^2/g$ to 150 $m^2/g$.

A viscosity of the catalyst ink may be 0.05 to 10 Pa·s. Besides, a dry thickness of the non-supported-catalyst containing catalyst layer may be less than or equal to 5 μm.

The non-supported-catalyst containing catalyst layer may further contain a carbon particle whose surface area is 5 to 200 $m^2/g$, as a water-repellent particle. In the case where the non-supported-catalyst containing catalyst layer that contains a carbon particle that is a water-repellent particle and has a surface area of 5 to 200 $m^2/g$, the following steps may be provided: a first mixture dispersion step of preparing an electrolyte-carbon mixture liquid by mixing and dispersing the electrolyte resin, the water-based solvent, and a carbon particle whose surface area is 5 to 200 $m^2/g$; and a second mixture dispersion step of preparing the catalyst ink by mixing and dispersing the metal catalyst nanoparticle in the electrolyte-carbon mixture liquid.

In order to further restrain the aggregation of the metal catalyst nanoparticle, mixture dispersion of the metal catalyst nanoparticle and another component may be performed while a temperature of the mixture liquid that contains the metal catalyst nanoparticle is kept at or below 40° C., in the second mixture dispersion step. Furthermore, from a similar viewpoint, the mixture dispersion of the catalyst ink may be performed by an ultrasonic dispersion method.

If a secondary particle diameter distribution of the metal catalyst nanoparticle in the catalyst ink is D90≤3 μm, the catalyst layer containing the metal catalyst nanoparticle whose electrochemically active surface area is 10 $m^2/g$ to 150 $m^2/g$ can be more reliably formed.

The non-supported-catalyst containing catalyst layer may be formed by spraying the catalyst ink to a support.

The fuel cell membrane-electrode assembly according to the foregoing aspects of the invention is high in the catalyst utilization rate, and is excellent in the gas diffusivity, the proton conductivity and the electrical conductivity, and therefore can deliver excellent power generation performance. Furthermore, because the utilization rate of the catalyst is high, the fuel cell membrane-electrode assembly enables cost reduction of the fuel cell. Still further, because a carbon support is not used, it is possible to restrain occurrence of various problems associated with the oxidation corrosion of a carbon support caused by fuel deficiency or the like and with the production of hydrogen peroxide by a carbon support.

Therefore, according to the foregoing aspects of the invention, it is possible to provide a fuel cell that is excellent in durability as well as in power generation performance.

A third aspect of the invention relates to a fuel cell membrane-electrode assembly that has: an electrolyte membrane; a fuel electrode provided at one surface side of the electrolyte membrane; and an oxidant electrode provided at another surface side of the electrolyte membrane, wherein at least one of the fuel electrode and the oxidant electrode has a non-supported-catalyst containing catalyst layer that contains a metal catalyst nanoparticle of 0.3 nm to 100 nm in primary particle diameter that is not supported on a support, and an electrochemically active surface area of the metal catalyst nanoparticle is 10 $m^2/g$ to 150 $m^2/g$, and a layer thickness of the non-supported-catalyst containing catalyst layer is less than or equal to 10 μm.

A fourth aspect of the invention relates to a production method for a fuel cell membrane-electrode assembly. In this production method, a catalyst ink that contains a metal catalyst nanoparticle of 0.3 nm to 100 nm in primary particle diameter which is not supported on a support, an electrolyte resin, and a water-based solvent is prepared, and a non-supported-catalyst containing catalyst layer is formed by using the catalyst ink, as a catalyst layer that is included in at least one of a fuel electrode side and an oxidant electrode side in the fuel cell membrane-electrode assembly that has a fuel electrode at one surface side of an electrolyte membrane, and an oxidant electrode at another surface side of the electrolyte membrane.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

A fuel cell membrane-electrode assembly (hereinafter, referred to simply as "membrane-electrode assembly") of an embodiment of the invention is a fuel cell membrane-electrode assembly that has a fuel electrode at one surface side of an electrolyte membrane, and an oxidant electrode at the other surface side thereof. At least one of the fuel electrode and the oxidant electrode has a non-supported-catalyst containing catalyst layer that contains a metal catalyst nanoparticle of 0.3 nm to 100 nm in primary particle diameter that is not supported on a support, and an electrochemically active surface area of the metal catalyst nanoparticle is 10 $m^2/g$ to 150 $m^2/g$, and a layer thickness of the non-supported-catalyst containing catalyst layer is less than or equal to 10 μm.

Figure 1:
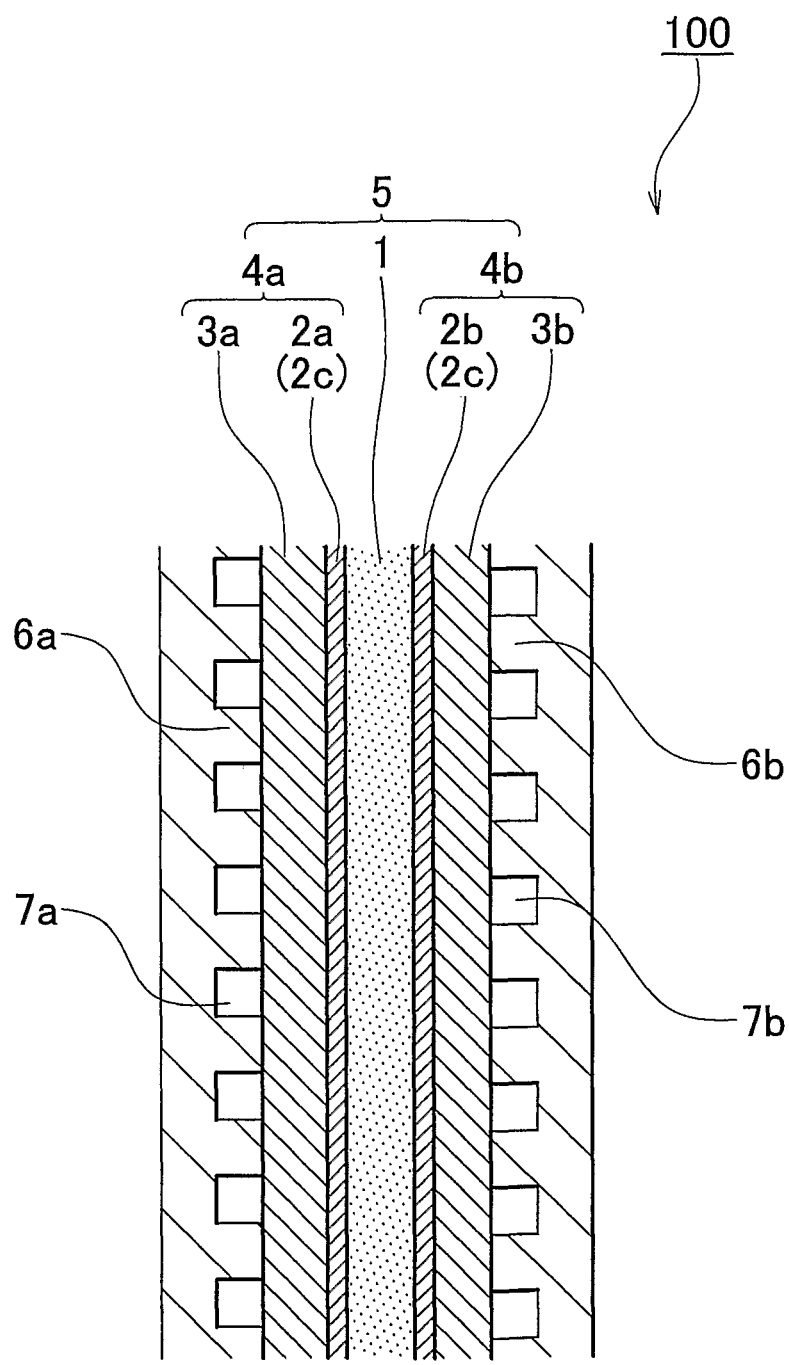
FIG. 1 is a diagram showing a cell that has a fuel cell membrane-electrode assembly in accordance with an embodiment of the invention.
Figure 2:
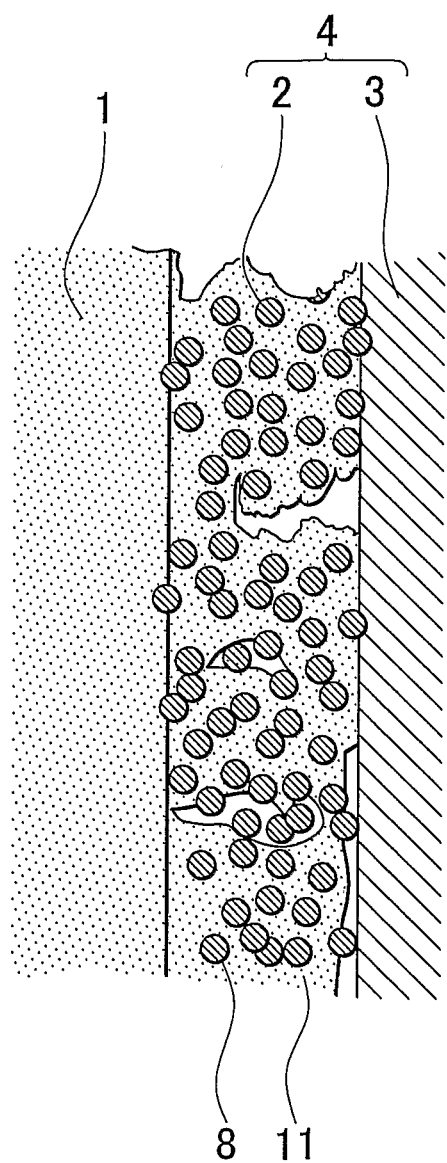
FIG. 2 is an enlarged partial view from FIG. 1.

An fuel cell membrane-electrode assembly of an embodiment of the invention will be described hereinafter with reference to FIGS. 1 and 2. FIG. 1 is a diagram showing an embodiment of the fuel cell membrane-electrode assembly of the invention, in a sectional view of a unit cell in which the fuel cell membrane-electrode assembly is provided. FIG. 2 is an enlarged partial view from FIG. 1.

In FIG. 1, a unit cell 100 has a membrane-electrode assembly 5 in which a fuel electrode (anode) 4a is provided on one side surface of an electrolyte membrane 1, and an oxidant electrode (cathode) 4b is provided on the other side surface thereof. In this embodiment, the two electrodes 4 (the fuel electrode 4a, the oxidant electrode 4b) have a structure in which a fuel electrode-side catalyst layer 2a (non-supported-catalyst containing catalyst layer 2c) and a fuel electrode-side gas diffusion layer 3a are stacked in that order from the electrolyte membrane side, and an oxidant electrode-side catalyst layer 2b (non-supported-catalyst containing catalyst layer 2c) and an oxidant electrode-side gas diffusion layer 3b are stacked in that order from the electrolyte membrane side. In each catalyst layer 2 made up of a non-supported-catalyst containing catalyst layer, metal catalyst nanoparticles 8 having catalytic activity for the electrode reactions and an electrolyte resin 11 coexist in a mixed fashion (see FIG. 2), thus providing places of the electrode reactions. The gas diffusion layer 3 is a layer for heightening the diffusivity of the reactant gas to the catalyst layer 2.

In this embodiment, each electrode 4 has a stacked structure in which the catalyst layer 2 and the gas diffusion layer 3 are stacked. However, each electrode 4 may have a single-layer structure made up of only a catalyst layer 2, or may also have a stacked structure that has a catalyst layer 2, a gas diffusion layer 3, and one or more other layers. The fuel and the oxidant supplied to the fuel electrode and the oxidant electrode, respectively, are a fuel gas and an oxidant gas in this embodiment. However, the fuel and the oxidant are not limited to gas; for example, a liquid fuel, such as methanol or the like, can also be used.

The membrane-electrode assembly 5 is sandwiched by a fuel electrode-side separator 6a and an oxidant electrode-side separator 6b, thus constituting the unit cell 100. Each separator 6 defines a channel 7 (7a, 7b) for supplying a reactant gas (the fuel gas, the oxidant gas) to a corresponding one of the electrodes 4, and provides a gas seal between unit cells, and also functions as a current collector. The fuel electrode 4a is supplied with the fuel gas (hydrogen-containing or hydrogen-producing gas, ordinarily, a hydrogen gas) from the channel 7a. The oxidant electrode 4b is supplied with the oxidant gas (oxygen-containing or oxygen-producing gas, ordinarily, air) from the channel 7b.

Ordinarily, a plurality of unit cells 100 are stacked to provide a stack, which is then incorporated into a fuel cell.

Figure 7:
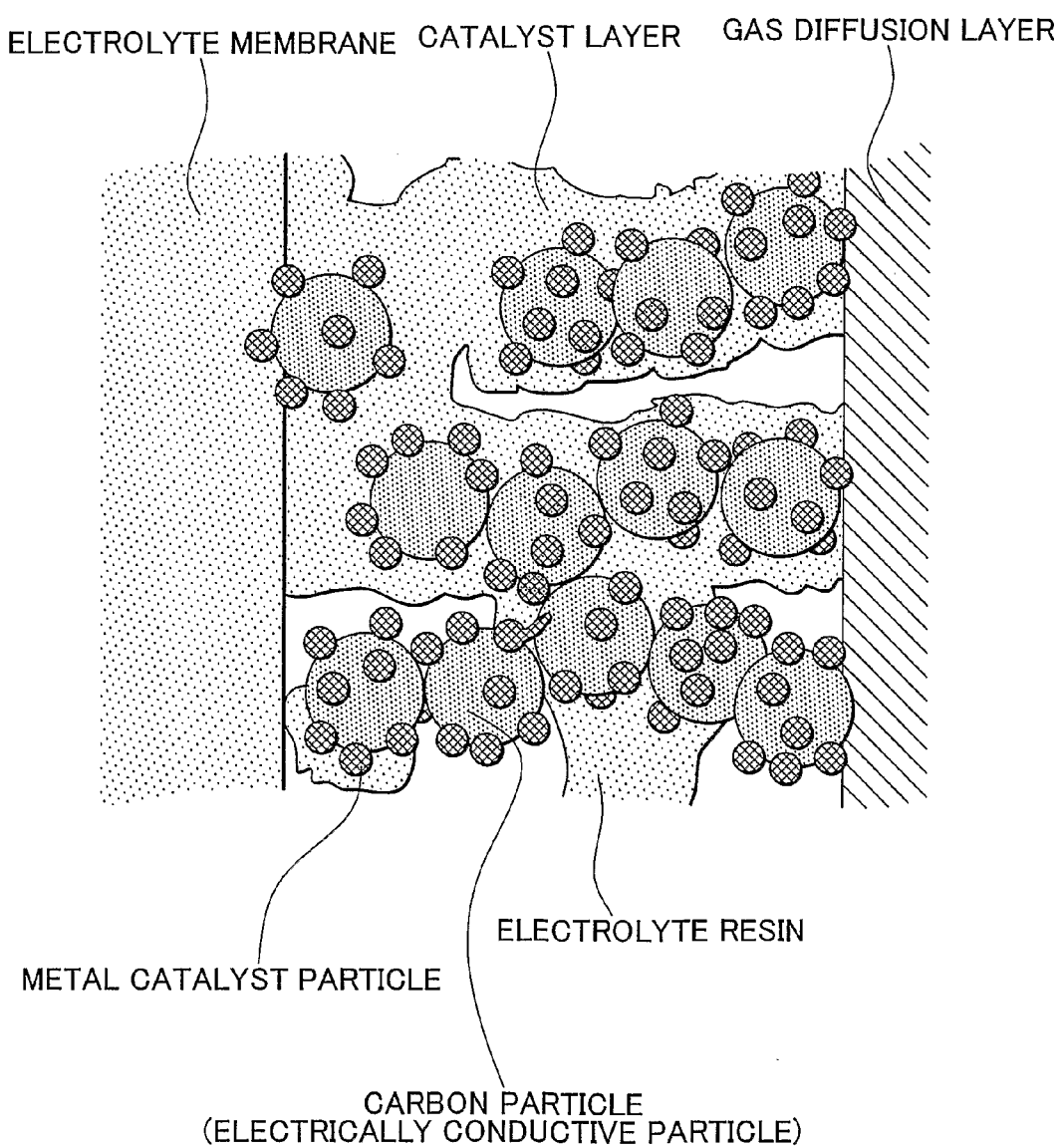
FIG. 7 is a diagram showing a cell that has a related-art fuel cell membrane-electrode assembly.

Generally, related-art fuel cell membrane-electrode assemblies contain metal catalyst particles in a state where they are supported on carbon particles (a carbon support, and electrically conductive particles) as shown in FIG. 7. On the other hand, the fuel cell membrane-electrode assembly of this embodiment, as shown in FIG. 2, has a non-supported-catalyst containing catalyst layer that contains the metal catalyst nanoparticle 8 having catalytic activity for the electrode reactions in a simple state where the metal catalyst nanoparticle 8 is not supported on a support.

Although the fuel cell membrane-electrode assembly of this embodiment contains a metal catalyst nanoparticle whose primary particle diameter is as very small as 0.3 to 100 nm in a state where the metal catalyst nanoparticle is not supported on a support, such as carbon particle or the like, the electrochemical surface area of the metal catalyst nanoparticle in the electrode is as large as 10 m$^2$/g to 150 m$^2$/g. By containing metal catalyst nanoparticles whose particle diameter is very small in a state where the metal catalyst nanoparticles are highly dispersed while being restrained from aggregating, and a good exposed surface area is secured, as described above, the catalyst utilization rate can be heightened. Because the metal catalyst nanoparticles are not supported on a support, the layer thickness of the catalyst layer (electrode) can be reduced by an amount corresponding to the volume of the support and, concretely, can be reduced to 10 µm or less. Due to the layer thickness reduction of the catalyst layer, the catalyst layer improves in the electrical conductivity, the gas diffusivity and the proton conductivity, and a three-phase interface is efficiently formed within the catalyst layer. Furthermore, because the metal catalyst nanoparticles are not supported on a support, many metal catalyst nanoparticles can be concentrated to an interface between the membrane and the electrode, and the catalyst utilization rate can be further heightened, in comparison with the case where metal catalyst nanoparticles are supported on a support. Furthermore, because metal catalyst nanoparticles make metal contacts with one another, a further effect of lowered resistance of the catalyst layer is obtained.

A further advantage of employing metal catalyst nanoparticles without supporting them on a support made of a carbon material is that the oxidation corrosion of the carbon material support in the fuel electrode at the time of fuel deficiency does not occur in principle. In order to secure protons and electrons in the fuel electrode in a fuel deficiency state, the electrolysis of water ($H_2O \rightarrow 2H^+ + 2e^- + \frac{1}{2}O_2$) sometimes progresses. If it becomes difficult to secure sufficient amounts of protons and electrodes solely through the electrolysis of water alone, there is a tendency to secure protons and electrons through the oxidation of carbon ($C + 2H_2O \rightarrow CO_2 + 4H^+ + 4e^-$). If the carbon material serving as a support of the metal catalyst decomposes and depletes due to this reaction, metal catalyst particles fall apart or move, and the catalyst activity declines. Furthermore, the decomposition, the depletion and the surface oxidation of the carbon material, which is a water-repellent electrically conductive material, result in declines in the electrical conductivity and the water-repellency of the catalyst layer. Still further, due to changes in the catalyst layer structure, the three-phase interface may remarkably reduce.

On the oxidant electrode side, on the other hand, when the fuel deficiency is resolved, the partial cell reaction caused by nonuniform distribution of the fuel on the fuel electrode side results in abnormal electrical potential, which causes the oxidative reaction of carbon to progress as in the case of the fuel electrode at the time of fuel deficiency, so that declines in various power generation characteristics as stated above occur.

The problems associated with the oxidation corrosion of the carbon support as mentioned above do not occur in this embodiment because the embodiment does not use a carbon support.

Furthermore, the carbon material has catalytic activity for reactions in which hydrogen peroxide is produced from oxygen and hydrogen, and therefore is a cause of the degradation of the electrolyte membrane or the like by radicals produced from hydrogen peroxide. However, this embodiment can restrain such degradation because the embodiment does not use a carbon support.

As described above, the fuel cell membrane-electrode assembly of this embodiment not only improves the catalyst utilization rate, but also has such excellent durability as to deliver stable power generation performance over a long period.

In this embodiment, the metal catalyst nanoparticle used as a catalytically active substance that accelerates the electrode reactions is a very small-size particles whose primary particle diameter is 0.3 to 100 nm. The primary diameter of the metal catalyst nanoparticle may be 2 to 20 nm, and particularly 5 to 10 nm, from the viewpoints of securement of an exposed surface area of a metal catalyst, the dispersibility of the metal catalyst nanoparticle, the elution characteristic of the metal catalyst, etc. If the primary particle diameter is smaller than 0.3 nm, the exposed surface area becomes large, but the surface energy also becomes large, so that the aggregation becomes more likely. Furthermore, there is risk that the elution of the metal catalyst will become more likely to occur. On the other hand, if the primary particle diameter is larger than 100 nm, the surface energy is small, so that the aggregation and the elution of the metal catalyst will become less likely to occur. However, in that case, a good exposed surface area cannot be secured, and the catalyst utilization rate cannot be sufficiently improved. If the primary particle diameter is 5 to 10 nm, the balance between the exposed surface area and the surface energy is particularly good.

Incidentally, the primary particle diameter of the metal catalyst nanoparticle herein is a value converted from the specific surface area found by the metal surface area measurement by a BET method that uses a nitrogen gas or a CO gas, or by a chemical adsorption method. For example, each metal catalyst nanoparticle is assumed to be a cube, and the side of the cube is calculated from the specific surface area found by the metal surface area measurement. Alternatively, each metal catalyst nanoparticle is assumed to be a sphere, and the diameter thereof is calculated from the specific surface area found by the metal surface area measurement.

The particle diameter of the metal catalyst nanoparticle can also be checked (monitored) by using a TEM (transmission electron microscope), an XRD (X-ray diffraction method).

As for the metal catalyst nanoparticle having a primary particle diameter as mentioned above, the surface area of the particle itself may be greater than or equal to 1 m$^2$/g, and particularly 10 m$^2$/g to 150 m$^2$/g. The bulk density thereof may be 0.1 g/cm$^3$ to 21.37 g/cm$^3$, and particularly preferably is less than or equal to 2.0 g/cm$^3$. If the bulk density of the metal catalyst nanoparticle is great, there is risk of strong aggregation and insufficient dispersion. Furthermore, the catalyst ink application characteristic deteriorates, and the formation of a uniform catalyst layer becomes difficult.

The metal catalyst nanoparticle is not particularly limited as long as it has catalytic activity for the electrode reaction at the fuel electrode or the oxidant electrode. As the metal catalyst nanoparticle, nanoscale metal particles (including alloy particles) may be used. Concrete examples of the metal catalyst nanoparticle include nanoparticles of: platinum, alloys of platinum and a first to third transition metal, such as iron, nickel, manganese, copper, cobalt, chrome, vanadium, titanium, scandium, etc., or an oxide of such a first to third transition metal; alloys of platinum and a noble metal, such as ruthenium, rhodium, palladium, silver, iridium, gold, etc.; three-element or four-element alloys of platinum and a first to third transition metal and a noble metal; alloys of a noble metal other than platinum and a first to third transition metal; alloys of platinum and a noble metal other than platinum; etc. However, from the viewpoint of the oxygen reduction activity, the hydrogen oxidation activity, the dissolution resistance, etc., the metal catalyst nanoparticle may particularly be platinum, an alloy of platinum and a first to third transition metal, an alloy of platinum and a noble metal other than platinum, etc. Incidentally, the alloy is not limited to the two-element system, but may also be of a multi-element system that employs three or more elements.

The metal catalyst nanoparticle contained in the non-supported-catalyst containing catalyst layer may be of only one kind or a combination of two or more kinds of metal catalyst nanoparticles. If platinum and another metal catalyst are used in combination, the amount of the other metal catalyst used may be 50 wt % or less of the amount of platinum used. Furthermore, the platinum particle and the metal catalyst particle used may have substantially equal power characteristics (particle diameter, bulk density, etc.).

If different kinds of metal catalyst nanoparticles, such as a platinum particle and another metal (including alloy) particle, are used in combination as the metal catalyst nanoparticle in the invention, non-supported-catalyst containing catalyst layers may be formed separately for the individual metal species of the metal catalyst nanoparticles, and then be stacked, or the metal catalyst nanoparticles may be mixed to form a single-layer non-supported-catalyst containing catalyst layer.

As for the platinum alloy, the composition ratio of the alloy component to platinum may be less than or equal to 99 atom %, and particularly less than or equal to 50 atom %. In order to accelerate the electrolysis of water at the time of fuel deficiency so that electrons and protons can be supplied only through the electrolysis of water, the platinum alloy may be an alloy that exhibits high activity for the electrolysis of water at an electrical potential that is lower than that for the oxidation of carbon. From a similar viewpoint, it is possible to use, besides platinum or an platinum alloy, a water electrolysis catalyst having higher catalytic activity for the electrolysis of water than platinum or the platinum alloy.

The metal catalyst nanoparticle may be of a core-shell type in which platinum or a platinum alloy is deposited around a core that is a particle of a substance with high chemical stability, for example, titanium, an oxide of titanium, etc.

The fuel cell membrane-electrode assembly of this embodiment has a non-supported-catalyst containing catalyst layer in which the small metal catalyst nanoparticle as mentioned above is highly dispersed without being supported on a support so that the electrochemically active surface area of the metal catalyst nanoparticle within the electrode is $10\,m^2/g$ to $150\,m^2/g$.

Herein, the metal catalyst nanoparticle being supported on a support means a state in which the metal catalyst nanoparticle is attached to a support surface in a monodisperse state. The metal catalyst nanoparticle not being supported on a support (non-supported catalyst) means (1) a state in which the non-supported-catalyst containing catalyst layer does not contain supportive particles that can become a support for supporting the metal catalyst nanoparticles, and the metal catalyst nanoparticles do not exist in the state of being attached to supportive particle surfaces, or (2) a state in which the non-supported-catalyst containing catalyst layer contains supportive particles that can become a support for supporting metal catalyst nanoparticles, but the metal catalyst nanoparticles are not attached to supportive particle surfaces in a monodisperse state, and instead, aggregates formed by aggregation of metal catalyst nanoparticles exist between supportive particles.

The mere mixture or dispersion of metal catalyst nanoparticles and supportive particles cannot attach the metal catalyst nanoparticles to supportive particle surfaces in a monodisperse state. Therefore, the preparation in which metal catalyst nanoparticles are supported on a support beforehand and the preparation in which a supportive component and metal catalyst nanoparticles are merely mixed are different from each other in the state of existence of the supportive component (support) and the metal catalyst nanoparticles.

The support and the non-support of metal catalyst nanoparticles described above can be checked through a transmission electron microscope (TEM), a scanning electron microscope (SEM), etc.

The electrochemically active surface area of metal catalyst nanoparticles is a value converted from the quantity of electricity for the adsorption of monoatomic layer hydrogen or a surface oxide to surface atoms of metal catalyst nanoparticles contained within the non-supported-catalyst containing catalyst layer, and represents the surface area of the metal catalyst nanoparticles contained in the non-supported-catalyst containing catalyst layer which surface area can participate in the reactions. Concretely, the electrochemically active surface area of metal catalyst nanoparticles can be found by performing cyclic voltammetry measurement with respect to an electrode having a non-supported-catalyst containing catalyst layer, and calculating, from an obtained voltammogram, the quantity of electricity (hydrogen desorption electricity quantity) for the desorption of hydrogen from surface atoms of the metal catalyst nanoparticle or the electricity quantity for oxide reduction, and dividing the hydrogen desorption electricity quantity or the oxide reduction electricity quantity by the electricity quantity for the adsorption of monoatomic layer hydrogen or oxide to surface atoms of the metal catalyst nanoparticle.

For example, generally in the case where a platinum nanoparticle is used as the metal catalyst nanoparticle, the electricity quantity for adsorption of monoatomic layer hydrogen to platinum surface atoms is assumed to be $210\,\mu C$ per $1\,cm^2$, and the value obtained by dividing the hydrogen desorption electricity quantity at 50 mV to 400 mV in the voltammogram by $210\,\mu C/cm^2$ can be determined as an electrochemically active surface area of the platinum nanoparticle (metal catalyst nanoparticle) in the non-supported-catalyst containing catalyst layer.

From the viewpoint of the catalyst utilization rate, the electrochemically active surface area of the metal catalyst nanoparticle within the non-supported-catalyst containing catalyst layer may be 20 to $50\,m^2/g$.

The production method for the metal catalyst nanoparticle is not particularly limited. For example, the metal catalyst nanoparticle can be produced by a wet method or a dry method as mentioned above. Examples of the wet method include a method in which a platinum complex is reduced and reductively deposited (at this time, an alloy metal species may be deposited together) and the deposit is washed and dried, a method in which a nanoparticle is formed by reducing a platinum complex together with a component having a protecting group, such as poly vinyl pyrrolidone (PVP), citric acid, polyacrylic acid (PAA), trimethyl ammonium (TMA), polyethylene imine (PEI), and substitution with a solution containing fluorine-containing ion exchange resin is performed to obtain a fluorine-containing ion exchange resin solution containing a platinum particle, etc. Examples of the dry method include a method in which platinum or a platinum alloy is deposited by cooling a metal vapor thereof, a method in which a platinum alloy complex solution is jetted in a reductive atmosphere for the reductive deposition, etc. Furthermore, a commercially available product of the metal catalyst nanoparticle may also be used.

As described above, the fuel cell membrane-electrode assembly of this embodiment has a non-supported-catalyst containing catalyst layer that contains a very small metal catalyst nanoparticle in a state where the metal catalyst nanoparticle is highly dispersed without being supported on a support, and therefore achieves high catalyst utilization rate. Therefore, the amount of the metal catalyst nanoparticle per unit area within the non-supported-catalyst containing catalyst layer can be set at 0.001 to 10 mg/cm$^2$. The amount of metal catalyst nanoparticle per unit area in the non-supported-catalyst containing catalyst layer may be 0.01 to 5 mg/cm$^2$, and particularly preferably it is 0.05 to 0.3 mg/cm$^2$. Particularly, the oxidant electrode is high in overvoltage. Therefore, in the related-art fuel cell membrane-electrode assemblies, the oxidant electrode needs at least 4 to 10 mg/cm$^2$ of metal catalyst in order to provide sufficient cell performance. The fuel cell membrane-electrode assembly of this embodiment, on the other hand, requires only a relatively small amount of metal catalyst as mentioned above, for example, 0.05 to 0.3 mg/cm$^2$, which is at most a tenth of the amount required in the related-art electrode, in order to provide a cell performance equivalent to or better than that of the related art.

Furthermore, in the fuel cell membrane-electrode assembly of this embodiment, because the metal catalyst nanoparticle is contained in the non-supported-catalyst containing catalyst layer without being supported on a support, the catalyst layer can be reduced in thickness to a layer thickness of 10 μm or less. From the viewpoint of the proton conductivity, the gas diffusivity, and the electrical conductivity, the layer thickness of the non-supported-catalyst containing catalyst layer may also be less than or equal to 5 μm and, furthermore, less than or equal to 2 μm.

If the non-supported-catalyst containing catalyst layer is provided in the fuel electrode-side electrode, the aforementioned layer thickness reduction of the catalyst layer as mentioned above also achieves the following effect. That is, the amount of water content taken from the fuel electrode due to the strength of stream of the fuel gas increases, and the back diffusion of water from the oxidant electrode is accelerated. In the oxidant electrode, water is produced in association with the electrode reaction, and so-called flooding in which the water resides within the electrode is likely to occur. Therefore, the acceleration of the back diffusion of water to the fuel electrode side restrains occurrence of the flooding, so that the decline in the power generation performance due to the flooding can be prevented.

From the viewpoint of preventing the flooding, the non-supported-catalyst containing catalyst layer may contain a water-repellent particle. The non-supported-catalyst containing catalyst layer has a tendency for occurrence of the so-called flooding in which due to the layer thickness reduction of the catalyst layer, water resides resulting a flooded state. The residence of water can be restrained by heightening the water repellency of the non-supported-catalyst containing catalyst layer through containing the water-repellent particle in the layer, and by increasing the porosity.

Figure 8:
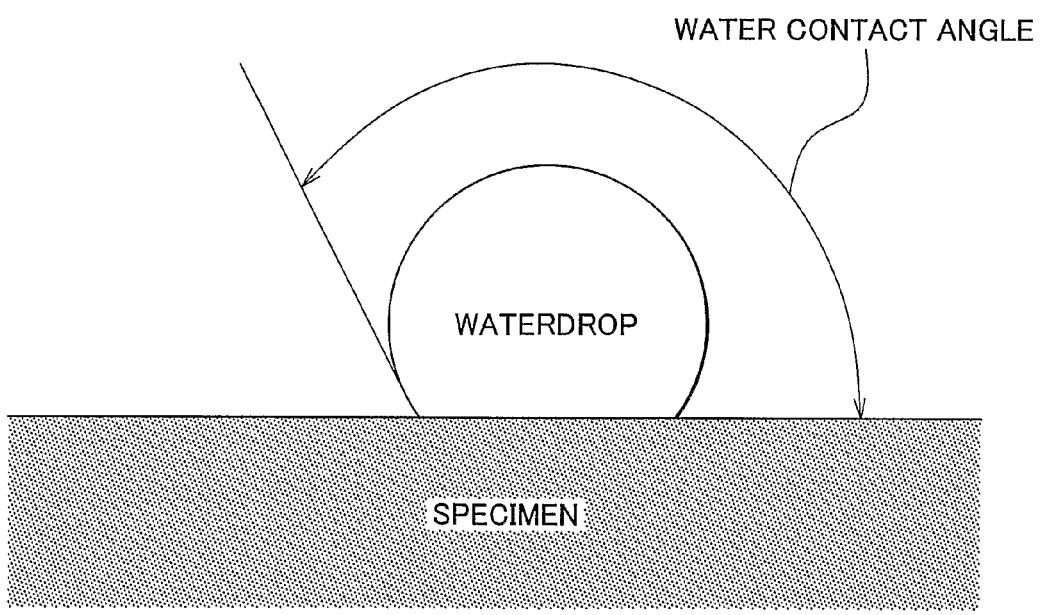
FIG. 8 is a diagram illustrating a water contact angle.

The water-repellent particle herein may have a water contact angle of 90° to 150°, and particularly 110° to 130°. The water contact angle of the water-repellent particle can be measured pursuant to a common method, as follows. That is, a waterdrop is dropped to a surface of a platy specimen made of the same material as the water-repellent particle, and the angle formed by a plane of the material and the waterdrop is measured (see FIG. 8). As for the water-repellent particle, the particle diameter based on a particle size measurement may be 0.05 to 1 μm. The particle diameter found by the particle size measurement of the water-repellent particle can be measured pursuant to a common method.

As the water-repellent particle, carbon particle is preferably used. This is because the carbon particle has electrical conductivity, and therefore has an effect of improving the electrical conductivity of the non-supported-catalyst containing catalyst layer. In particular, a carbon particle whose surface area is small, concretely, 5 to 200 m$^2$/g, may be used. In particular, a carbon particle whose surface area is 5 to 100 m$^2$/g, and more preferably 5 to 50 m$^2$/g, may be used. Because the surface area of the carbon particle commonly used as a catalyst support is greater than or equal to 300 m$^2$/g, the surface area of the carbon particle mentioned above is very small. The carbon particle with small surface area as mentioned above is inferior in the characteristic as a catalyst support to the carbon particle that is commonly used as a carbon support that supports a catalyst, but has higher oxidation resistance than the carbon particle used as a catalyst support.

The surface area of the carbon particle that is a water-repellent particle can be measured through the utilization of the BET method using a nitrogen gas which is employed to measure the particle diameter of the metal catalyst nanoparticle.

From the viewpoint of preventing the oxidation corrosion of the carbon particle, the carbon particle that is a water-repellent particle may be a highly crystallized carbon that is excellent in corrosion resistance. The highly crystallized carbon herein is a carbon whose surface area based on the BET method is less than or equal to 200 m$^2$/g and whose interplanar spacing d002 is 3.36 to 3.5 Å. Such a highly crystallized carbon generally has, in a surface thereof, a basal plane.

The carbon particle that is a water-repellent particle may be contained in the non-supported-catalyst containing catalyst layer in an amount of about 50% or less and particularly about 30% or less in weight ratio to the metal catalyst nanoparticle. If the amount of the carbon particle that is a water-repellent particle is more than 50 wt % of the metal catalyst nanoparticle, the layer thickness of the non-supported-catalyst containing catalyst layer becomes excessively great.

The shape of the carbon particle that is a water-repellent particle is not particularly limited; for example, the shape may be generally spherical, or may also be a shape whose aspect ratio is relatively high as in carbon fiber. The carbon fiber easily forms electron conduction pathways, and therefore has high effect of improving the electrical conductivity of the non-supported-catalyst containing catalyst layer, and therefore can reduce the resistance of the catalyst layer, and therefore can be suitably used. The carbon fiber also has an advantage of easily forming a porous structure. As for the carbon fiber, the aspect ratio may be 10 to 1000.

The carbon particle that is a water-repellent particle does not need to be of a single kind, but may also be used as a combination of a generally spherical carbon particle and a carbon particle whose aspect ratio is high, such as a carbon fiber.

The carbon particle that is a water-repellent particle may be contained in either one or both of the fuel electrode-side electrode and the oxidant electrode-side electrode. However, it is particularly effective if the carbon particle is contained in the oxidant electrode side where water is produced by the electrode reaction and therefore flooding is likely to occur.

The non-supported-catalyst containing catalyst layer may further contain an electrolyte resin. Although electric power generation is still possible if the non-supported-catalyst containing catalyst layer does not contain an electrolyte resin, an electrolyte resin may be contained in the layer from the viewpoint of the proton conductivity, the forming characteristic of the non-supported-catalyst containing catalyst layer, the fixing characteristic of the metal catalyst nanoparticle within the non-supported-catalyst containing catalyst layer, etc.

The electrolyte resin is not particularly limited, and an electrolyte resin that is generally used in the solid polymer fuel cells may be used. For example, it is possible to use fluorine-based electrolyte resins, such as perfluorocarbon sulfonic acid resins represented by Nafion (trade name, made by DuPont), and hydrocarbon-based electrolyte resins in which an ion-exchange group, such as a sulfonic acid group, a boronic acid group, a phosphonic acid group, a hydroxyl group, etc., has been introduced into a hydrocarbon-based resin such as polyether sulfone, polyimide, polyether ketone, polyether ether ketone, polyphenylene, etc.

The amount of the electrolyte resin compounded may be 0.1 to 100 parts by weight, and particularly 0.1 to 30 parts by weight, and more particularly 3 to 10 parts by weight, with respect to 100 parts by weight of the metal catalyst nanoparticle (platinum). If the amount of the electrolyte resin exceeds 100 parts by weight with respect to 100 parts by weight of the metal catalyst nanoparticle 100, there is a risk of the non-supported-catalyst containing catalyst layer having low substance diffusivity. On the other hand, if the amount of the electrolyte resin is less than 0.1 part by weight with respect to 100 parts by weight of the metal catalyst nanoparticle, the effect of improving the proton conductivity or improving the catalyst layer forming characteristic is weak, and there is risk that metal catalyst nanoparticles becoming likely to fall apart.

Figure 3:
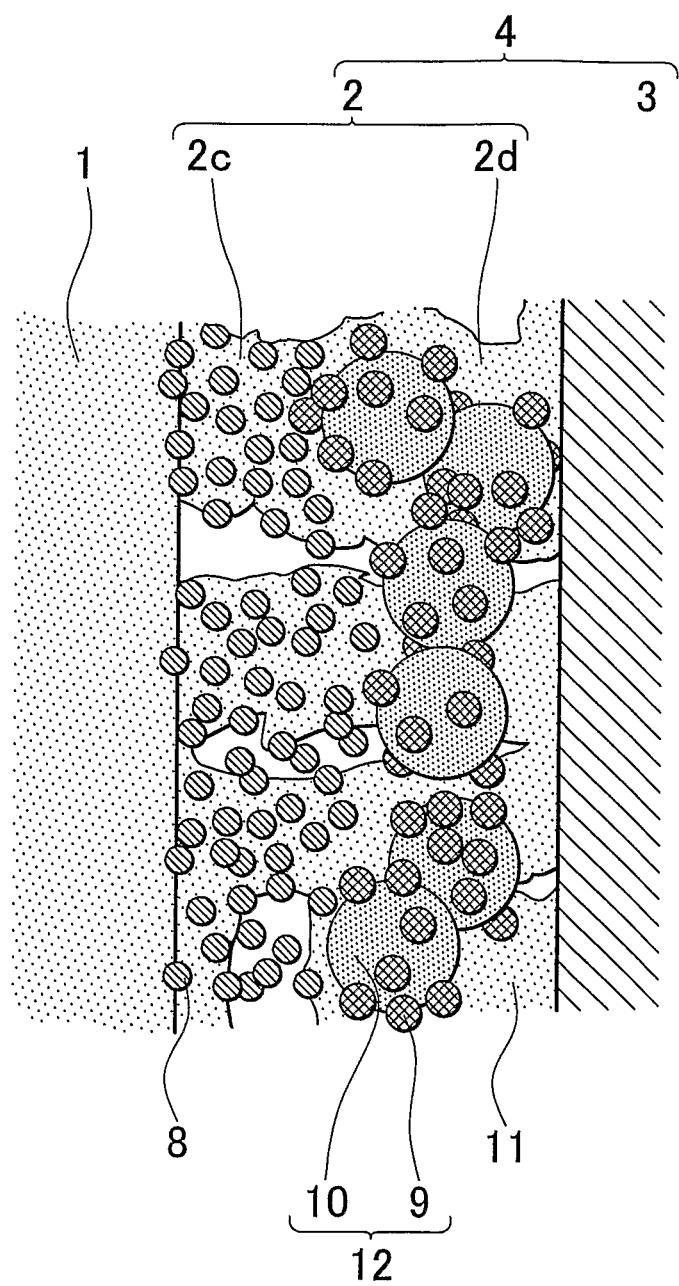
FIG. 3 is an enlarged partial view showing the fuel cell membrane-electrode assembly in accordance with another embodiment of the invention.

FIG. 3 shows another embodiment of the fuel cell membrane-electrode assembly of the invention. FIG. 3 is a sectional view of a unit cell provided in the fuel cell membrane-electrode assembly of another embodiment of the invention.

In FIG. 3, a fuel cell membrane-electrode assembly 4 has a structure in which a catalyst layer 2 and a gas diffusion layer 3 are stacked in that order from the side of an electrolyte membrane 1. The catalyst layer 2 has a multi-layer structure in which a first catalyst layer (non-supported-catalyst containing catalyst layer) 2c and a second catalyst layer 2d are stacked in that order from the side of the electrolyte membrane 1. In the first catalyst layer 2c, metal catalyst nanoparticles 8 not supported on a support, and an electrolyte resin 11 coexist in a mixed fashion, and the electrochemically active surface area of the metal catalyst nanoparticles is 10 to 150 $m^2/g$. In the second catalyst layer 2d, supported catalyst particles 12 obtained by supporting metal catalyst particles (catalyst) 9 on carbon particles 10 whose surface area is 5 to 200 $m^2/g$, and an electrolyte resin 11 coexist in a mixed fashion.

As stated above, the non-supported-catalyst containing catalyst layer tends to undergo flooding. Therefore, in order to prevent flooding, a layer having a water-repellent characteristic may be provided at a reactant gas channel side (a fuel or oxidant channel side) of the non-supported-catalyst containing catalyst layer. The water-repellent layer may be a layer similar to the one provided in the related-art fuel cell membrane-electrode assembly, and, for example, may be a water-repellent layer formed from an electrically conductive powder grain, such as carbon particle, carbon fiber, etc., and a water-repellent resin, such as polytetrafluoroethylene and the like, etc.

In order to obtain a membrane-electrode assembly that causes the electrode reaction to subsidiarily progress even at a distant position apart from the electrolyte membrane and that exhibits high voltage and high output, it is possible to provide a water-repellent catalyst layer having water repellency, instead of the water-repellent layer. The water-repellent catalyst layer may be a catalyst layer as in the related-art membrane-electrode assembly, a layer obtained by containing a water-repellent material (e.g., a water-repellent resin, such as polytetrafluoroethylene or the like) in a catalyst layer as in the related-art membrane-electrode assembly. Furthermore, from the viewpoint of the oxidation resistance, a carbon particle whose surface area is 5 to 200 $m^2/g$ may be used as a water-repellent particle and as a catalyst support as in this embodiment.

The second catalyst layer, which is a water-repellent catalyst layer, differs from the first catalyst layer (non-supported-catalyst containing catalyst layer) that contains a carbon particle whose surface area is 5 to 200 $m^2/g$ as a water-repellent particle, in that in the second catalyst layer, a metal catalyst particle is supported on a carbon particle whose surface area is 5 to 200 $m^2/g$.

The surface area of the carbon particle that is a water-repellent particle and a catalyst support can be measured by the BET method mentioned above, and may particularly be a carbon particle whose surface area is 5 to 100 $m^2/g$, and more particularly a carbon particle whose surface area is 5 to 50 $m^2/g$. Furthermore, as for the carbon particle that is a water-repellent particle and a catalyst support, the particle diameter based on the particle size distribution measurement may be 0.05 to 1 μm.

The carbon particle with small surface area as mentioned above is inferior in the catalyst support characteristic to the carbon particle that is commonly used as a catalyst support, but is high in oxidation resistance, and resists corrosion. Therefore, it is possible to restrain the corrosion of the carbon support in the fuel electrode at the time of fuel deficiency as mentioned above, and the corrosion of the carbon support in the oxidant electrode at the time of abnormal potential after the fuel deficiency is resolved. As the highly corrosion-resistant carbon particle, a highly crystallized carbon is suitably used. The proportion of the carbon particle compounded may be 30 to 95%, and particularly 70 to 95%, with respect to the total weight of the metal-supported catalyst.

The carbon particle that is a water-repellent particle and a catalyst support is not limited to a generally spherical particle, but may be, for example, a carbon particle whose aspect ratio is relatively high as in carbon fiber.

The use of a carbon particle with small surface area as mentioned above makes it difficult to increase the amount of supported catalyst. However, the second catalyst layer is provided mainly for the purpose of improving the water repellency of the first catalyst layer, which is the non-supported-catalyst containing catalyst layer, and is subsidiarily provided as a catalyst layer that is the place of the electrode reaction. Therefore, from the viewpoint of not impairing the effects of this embodiment, such as the improvement of the catalyst utilization rate, the reduction of the amount of catalyst used, etc., the amount of the catalyst in the second catalyst layer may be about 0.001 to 0.5 $mg/cm^2$, and particularly 0.001 to 0.1 $mg/cm^2$, and more particularly 0.001 to 0.05 $mg/cm^2$, per unit area of the second catalyst layer.

As the catalyst in the second catalyst layer, the same catalyst as that supported on a carbon particle or the like in the related-art catalyst layer may be used. Concrete examples of the catalyst include a platinum, noble metals, such as ruthenium and the like, alloys of platinum and transition metals, such as the first to third transition metals and the like, or oxides of the transition metals, etc. The primary particle diameter of the catalyst is preferably 1 to 10 nm, and may particularly be 3 to 6 nm. As the catalyst contained in the second catalyst layer, a metal catalyst nanoparticle may be used.

The electrolyte resin contained in the second catalyst layer may be substantially the same as in the non-supported-catalyst containing catalyst layer. In the second catalyst layer, the proportion of the electrolyte resin compounded may be about 0.83 to 2.5, and particularly about 1 to 1.6, in weight ratio to the carbon particle that is a catalyst support.

The layer thickness of the second catalyst layer may be less than or equal to 50 μm, and particularly 1 to 40 μm, and more particularly 1 to 30μ. If the layer thickness of the second catalyst layer is greater than 50 μm, the layer thickness of the whole catalyst layer becomes great so that there is risk of reducing the effects achieved by the layer thickness reduction of the catalyst layer in this embodiment.

In this embodiment, the layer thickness of the first catalyst layer made up of the non-supported-catalyst containing catalyst layer may be less than or equal to 10 μm, and particularly 5 μm, and more particularly 2 μm, from the viewpoint of substance diffusion.

Furthermore, the amount of the catalyst in the first catalyst layer may be 0.001 to 10 mg/cm$^2$, and particularly 0.01 to 5 mg/cm$^2$, and more particularly 0.05 to 0.3 mg/cm$^2$, per unit area of the first catalyst layer.

Furthermore, from the viewpoint of reduction of the use of the catalyst in association with the improved catalyst utilization rate, the total amount of the catalyst (including the metal catalyst nanoparticle) contained in the entire catalyst layer that includes the first catalyst layer and the second catalyst layer may be 0.001 to 10 mg/cm$^2$, and particularly 0.01 to 5 mg/cm$^2$, and more particularly 0.1 to 0.3 mg/cm$^2$, per unit area.

By forming a catalyst layer with a stacked structure, flooding can be prevented while the effects of the embodiment are maintained. That is, it is possible to restrain flooding, which would otherwise be more likely to occur due to the layer thickness reduction of the catalyst layer, in addition to the aforementioned effects obtained by highly dispersing the small metal catalyst nanoparticle without supporting it on a support. This is because the provision of the second catalyst layer containing the carbon particle supporting the catalyst at the gas diffusion layer side increases the porosity of the catalyst layer, and therefore improves the drainage of the water produced in the first catalyst layer.

Besides, in the second catalyst layer at the fuel electrode side, if the carbon particle excellent in corrosion resistance is used as a carbon particle for supporting the catalyst, the oxidation corrosion of the carbon particle at the time of fuel deficiency is less likely to occur. Besides, in the second catalyst layer at the oxidant electrode side, if the carbon particle excellent in corrosion resistance is used as a carbon particle for supporting the catalyst, the oxidation corrosion of the carbon particle at the time of an abnormal potential state after the fuel deficiency is resolved is less likely to occur. Therefore, the problems associated with the oxidation corrosion of the carbon support as mentioned above are less likely to occur.

The catalyst layer having a multi-layer structure that includes the first catalyst layer and the second catalyst layer may be provided only in the oxidant electrode, or only in the fuel electrode, or in both the oxidant electrode and the fuel electrode. However, it is particularly effective to use the catalyst layer at the oxidant electrode side, at which flooding is likely to occur due to the reaction-produced water.

The invention is not limited to the production method for the fuel cell membrane-electrode assembly of this embodiment. For example, the fuel cell membrane-electrode assembly can be formed by dry methods, such as chemical vapor deposition (CVD), ion beam, etc., wet methods, such as electrolytic plating, non-electrolytic plating, etching, etc., methods using self-assembly of metal colloids (metal catalyst nanoparticle-organic composite) or using a catalyst ink containing a metal catalyst nanoparticle, etc., a method of stacking metal catalyst nanoparticles, etc. It is possible to employ a method that uses a catalyst ink because the method can easily be introduced into an existing production line.

The catalyst ink is a solution or the like obtained by dissolving or dispersing a metal catalyst nanoparticle that forms the non-supported-catalyst containing catalyst layer, and an electrolyte resin as needed, in a solvent. In order that, in the non-supported-catalyst containing catalyst layer manufactured through the use of a catalyst ink containing a metal catalyst nanoparticle of 0.3 nm to 100 nm, the electrochemical surface area of the metal catalyst nanoparticle become 10 to 150 m$^2$/g, it is necessary to highly disperse the metal catalyst nanoparticle in the catalyst ink.

The solvent of the catalyst ink is not particularly limited in the invention. However, from the viewpoint of restraining the aggregation of metal catalyst nanoparticles, a water-based solvent may be used.

The water-based solvent herein means a solvent that contains substantially only water as a solvent for dissolving or dispersing the solutes of the catalyst ink, such as the metal catalyst nanoparticle, the electrolyte resin, etc. As the catalyst layer-purpose ink, a single or mixed solvent made up of one kind or two or more kinds of organic solvents, or a solvent containing such a single or mixed organic solvent has been used. However, such organic solvents produce oxidation heat to some degrees because they have reaction activity with respect to a component contained in the ink. Because the metal catalyst nanoparticle is very small, dispersion of the metal catalyst nanoparticle in an organic solvent without supporting it on a support will very likely result in aggregation thereof due to the influence of a very small amount of oxidation heat.

Therefore, in this embodiment, a water-based solvent containing substantially only water may be used as a catalyst ink-purpose solvent. The water-based solvent containing substantially only water in this embodiment may be a water-based solvent that does not contain any organic solvent at all (including a case where an organic solvent as an inevitable impurity is contained). However, the water-based solvent may contain an organic solvent to such an extent that aggregation of metal catalyst nanoparticles is not caused. For example, the water-based solvent may contain an organic solvent as an additive, such as a surface active agent that assists dispersion or solution of the metal catalyst nanoparticle, the electrolyte resin or the like, etc.

If the water-based solvent contains an organic solvent, the permissible amount thereof may be set within such a range that the secondary particle diameter distribution of the metal catalyst nanoparticle in the catalyst ink is D90≤3 μm. More concretely, the proportion of the organic solvent to the whole water-based solvent may be set at 0.1 wt % or less, and particularly may be set at 0.05 wt % or less.

A production method for a catalyst ink in which the metal catalyst nanoparticle is highly dispersed will be described in detail hereinafter.

In the catalyst ink, the amount of the metal catalyst nanoparticle may be 20 to 80 wt %, and particularly about 40 to 50 wt %. If the electrolyte resin is used, the amount of the electrolyte resin compounded with respect to the water-based solvent may be about 5 to 10 wt %. As an electrolytic solution containing the electrolyte resin in the water-based solvent, it is possible to use commercially available solutions, such as Nafion DE1020 or DE1021 (trade name, by DuPont), reagents made by Aldrich, etc. In the preparation of the catalyst ink, the order of mixing the compounds is not particularly limited; however, the metal catalyst nanoparticle may be put in after the water-based solvent and the electrolyte resin have been mixed and dispersed.

The method of dispersing the metal catalyst nanoparticle, the electrolyte resin and the water-based solvent is not particularly limited. Examples of the method include medium-type dispersion methods that use beads or the like, dispersion methods in which metal catalyst nanoparticles are crushed by a dispersion device or a dispersion auxiliary device as in a roll mill, medium-less methods that use a jet mill, a disk, etc., ultrasonic dispersion methods, etc.

However, the medium-type dispersion methods and the dispersion methods that use a roll mill have risk of aggregating metal catalyst nanoparticles due to the physical shear force that acts on metal catalyst nanoparticles or heat of collision between metal catalyst nanoparticles. If sufficient initial kneading is not performed, aggregates of metal catalyst nanoparticles are squeezed to a foil-like form so that the electrochemically active surface area declines, and furthermore, aggregates of foil-like squeezed metal catalyst nanoparticles may pierce the electrolyte membrane at the time of assembling cells, resulting in serious damages to the electrolyte membrane, such as pinholes, cracks, etc.

The medium-less dispersion methods, unlike the medium-type dispersion methods and the roll mill, do not squeeze the aggregates of metal catalyst nanoparticles into a foil-like form. However, the methods have risk of aggregating metal catalyst nanoparticles due to the physical shear force that acts on metal catalyst nanoparticles or heat of collision between metal catalyst nanoparticles.

Hence, the method of dispersing the catalyst ink may be ultrasonic dispersion in particular. By adopting the ultrasonic dispersion or like dispersion methods in which energy is applied to the metal catalyst nanoparticles as a solute without causing physical shear force on metal catalyst particles nor collision between metal catalyst particles, it is possible to restrain the aggregation of small metal catalyst nanoparticles. However, the ultrasonic dispersion method can cause aggregation of metal catalyst nanoparticles if excessive energy is applied. Therefore, conditions, such as energy strength, time, etc., may be appropriately adjusted.

Metal catalyst nanoparticles aggregate if heated. Therefore, in the step of preparing the catalyst ink, it is important to keep the temperature of the mixture liquid containing the metal catalyst nanoparticle at or below 40° C. The temperature of the mixture liquid may particularly be kept at or below 30° C., and more particularly at or below 20° C.

It is preferable that the secondary particle diameter distribution of the metal catalyst nanoparticle in the catalyst ink be D90≤3 μm. The secondary particle diameter distribution may particularly be D90≤2 μm, and more particularly D≤1 μm. If the particle size distribution of the secondary particle diameter of the metal catalyst nanoparticle in the catalyst ink is within the range as mentioned above, the catalyst ink is apt to form a non-supported-catalyst containing catalyst layer in which the electrochemically active surface area of the metal catalyst nanoparticle is 10 to 150 m$^2$/g.

As for the catalyst ink, large particles may be removed through the use of a membrane filter whose pore diameter is about 5 to 10 μm, after the aforementioned dispersion step. The viscosity of the catalyst ink can be appropriately adjusted in accordance with the method of applying the catalyst ink, and may be within the range of 0.05 to 10 Pa·s, and particularly 0.05 to 5 Pa·s. In particular, if the method employed to apply the catalyst ink is a spray method, the viscosity of the ink may be within the range of 0.05 to 5 Pa·s, and particularly 0.05 to 2 Pa·s.

If platinum and another metal catalyst are used in combination as the metal catalyst nanoparticle, it is preferable to prepare catalyst inks separately from each other, from the viewpoint of the dispersibility of metal catalyst nanoparticles. After sufficiently dispersed catalyst inks are prepared, the catalyst inks are mixed and then applied, or separately applied in a stacked fashion, in accordance with needs. Thus, a non-supported-catalyst containing catalyst layer in which the metal catalyst nanoparticle is highly dispersed is obtained.

Furthermore, if a water-repellent particle, such as a carbon particle or the like, with a surface area of 5 to 200 m$^2$/g, is contained in the non-supported-catalyst containing catalyst layer, it is possible to adopt the following process. That is, the carbon particle that is a water-repellent particle, the electrolyte resin and the water-based solvent are mixed and dispersed to prepare an electrolyte-carbon mixture liquid (first mixture dispersion step). After that, the metal catalyst nanoparticle is added to the prepared electrolyte-carbon mixture liquid to prepare a catalyst ink (second mixture dispersion step). As a dispersion method in each of the mixture dispersion steps, it is possible to adopt any suitable one of the aforementioned methods.

However, in the first mixture dispersion step, because the metal catalyst nanoparticle is not mixed and dispersed, a method that uses a medium, such as a bead mill or the like, or a dispersion method, such as a jet mill or the like, can suitably be used. In particular, a dispersion method that applies physical shear force, such as a bead mill or a roll mill, may be used. This is because the electrolyte resin is absorbed into small pores of the carbon particle or carbon fiber, and can be efficiently dispersed. In the first mixture dispersion step, it does not matter if the temperature of the electrolyte-carbon mixture liquid becomes 40° C. or higher.

In the case of the catalyst layer in which the first catalyst layer and the second catalyst layer are stacked, the first catalyst layer may be formed through the use of the catalyst ink prepared by a method as mentioned above. On the other hand, the second catalyst layer can be formed through the use of the catalyst ink prepared by a method as mentioned above, or can also be formed through the use of a catalyst ink prepared by a conventional common method. The first catalyst layer (non-supported-catalyst containing catalyst layer) that contains the carbon particle as a water-repellent particle is formed through the use of the catalyst ink prepared by simply mixing and dispersing with a metal catalyst nanoparticle and a carbon particle whose surface area is 5 to 200 m$^2$/g. On the other hand, the second catalyst layer is formed through the use of the catalyst ink prepared by using a supported catalyst particle obtained by supporting a metal catalyst particle on a carbon particle.

The obtained catalyst ink is applied directly to the electrolyte membrane, or applied directly to the gas diffusion layer, so that the catalyst layer is formed. The catalyst layer may also be formed by applying the catalyst ink to a base film to form a transfer film, and thermally transferring it to the electrolyte membrane or the gas diffusion layer. The method of directly applying the catalyst ink directly to the electrolyte membrane may be used, from the viewpoint of a characteristic of the junction between the electrolyte membrane and the catalyst layer.

If a catalyst layer that has the first catalyst layer and the second catalyst layer is formed, the following process may be adopted in order to improve the characteristic of the junction between the first catalyst layer and the second catalyst layer. That is, the first and second catalyst layers are formed in a stacked fashion on a surface of one of the electrolyte membrane and the gas diffusion layer, and then a membrane-electrode assembly is formed so that the first catalyst layer and the second catalyst layer formed in a stacked fashion are sandwiched by the electrolyte membrane and the gas diffusion layer.

The method of applying the catalyst ink is not particularly limited in the invention, and may be a common method such as an ink jet method, a spray method, a doctor blade method, a gravure printing method, a die coating method, etc. In order to form a non-supported-catalyst containing catalyst layer that has vacancies of several ten nm, a spray method is suitable. That is, the catalyst ink may be applied by spraying to the electrolyte membrane, or to a support such as a gas diffusion sheet, a base film, etc.

The method of drying the catalyst ink is not particularly limited. Examples of the drying method include the reduced-pressure drying, the drying by heating, a combination of the reduced-pressure drying and the drying by heating, etc. In order to avoid aggregation of metal catalyst nanoparticles, the catalyst ink may be dried under reduced pressure at about a room temperature (about 15 to 25° C.).

The membrane thickness of the non-supported-catalyst containing catalyst layer in a dry state is preferably 10 μm or less, and particularly preferably 5 μm or less, and may also be 2 μm or less.

The non-supported-catalyst containing catalyst layer may contain a component other than the aforementioned components as needed, within a range that does not impair the effects of the embodiment. Furthermore, in the catalyst layer of the membrane-electrode assembly of the embodiment, an additional layer other than the first and second catalyst layers may be formed as long as the layer does not impair the effects of the embodiment.

The gas diffusion layer sheet that constitutes the gas diffusion layer may be formed through the use of a material that has pores (voids) needed for the diffusion of the gas, electrical conductivity, and the strength required for the material that constitutes the gas diffusion layer, for example, electrically conductive porous materials, including carbon porous materials, such as carbon paper, carbon cloth, carbon felt, etc., metal meshes or metal porous materials formed from metals, such as titanium, aluminum, copper, nickel, nickel-chrome alloys, copper and its alloys, silver, aluminum alloys, zinc alloys, lead alloys, titanium, niobium, tantalum, iron, stainless steel, gold, platinum, etc., and so forth. If the gas diffusion layer is formed from a metallic porous material, the metal catalyst nanoparticle that is not supported on a support and the gas diffusion layer make an inter-metal contact, and therefore the contact resistance is expected to decrease.

The thickness of the electrically conductive porous material may be about 100 to 300 μm.

The gas diffusion layer sheet may be made up of a single layer of an electrically conductive porous material, and may also be provided with a water-repellent layer on a side that faces the catalyst layer. The water-repellent layer is, ordinarily, a layer having a porous structure that contains an electrically conductive powder grain, such as a carbon particle, a carbon fiber, etc., a water-repellent resin, such as polytetrafluoroethylene or the like, etc. The water-repellent layer, although not necessarily a requirement, has an advantage of being capable of improving the electrical contact between the catalyst layer and the gas diffusion layer while holding moderate amount of water content in the catalyst layer and the electrolyte membrane.

The method of forming the water-repellent layer on the electrically conductive porous material is not particularly limited in the invention. For example, a water-repellent layer paste is prepared by mixing an electrically conductive powder grain, such as a carbon particle or the like, a water-repellent resin, and another component as needed, with an organic solvent, such as ethanol, propanol, propylene glycol, etc., or water, or a mixture thereof, etc. Then, the water-repellent layer paste is applied to at least the catalyst layer-facing side of the electrically conductive porous material, and is dried and/or fired. Examples of the method of applying the water-repellent layer paste to the electrically conductive porous material include the screen printing method, the spray method, the doctor blade method, the gravure printing method, the die coating method, etc.

The method of joining the catalyst layer and the gas diffusion layer is not particularly limited in the invention. Examples of the method include a method in which the catalyst ink is directly applied to the gas diffusion layer as mentioned above, and, for the case where the catalyst layer is formed on the electrolyte membrane, a method in which the electrolyte membrane and the gas diffusion layer sheet are thermocompression-bonded.

Subsequently, examples of the invention will be described. Firstly, the manufacture of a fuel cell in a first example of the invention will be described.

A catalyst ink A was prepared by mixing and dispersing 4 g of a platinum nanoparticle of 5 nm in primary particle diameter, 3.6 g of a perfluorocarbon sulfonic acid resin solution in which a perfluorocarbon sulfonic acid resin was dispersed in a water-based solvent (trade name: Nafion DE1020, by DuPont, containing 11 wt % perfluorocarbon sulfonic acid resin), and 8 g of water, through the use of an ultrasonic homogenizer. In the mixture dispersion step, the temperature of an intermediate product of the catalyst ink A was kept at or below 40° C.

The obtained catalyst ink A was sprayed to one side surface of an electrolyte membrane (name of component: perfluorocarbon sulfonic acid, by Confidential, 50 μm in membrane thickness) so that the amount of platinum nanoparticle became equal to 0.2 $mg/cm^2$, and then was dried under reduced pressure under a temperature condition of 40° C. or lower. Thus, an anode-side catalyst layer (2 μm in membrane thickness). On the surface opposite from the electrolyte membrane, a cathode-side catalyst layer was formed in the same manner as in a first comparative example below. In this manner, a catalyst layer-electrolyte membrane-catalyst layer assembly was formed.

On the other hand, a water-repellent layer paste obtained by mixing a carbon black, a polytetrafluoroethylene (PTFE) dispersion solution, water, and propylene glycol was applied to a carbon paper (made by Toray) by a doctor blade method. The carbon paper was then cut into pieces of 3.6 cm×3.6 cm. After that, the carbon paper pieces were dried and fired, thus obtaining gas diffusion layer sheets (2 sheets) equipped with the water-repellent layer.

The catalyst layer-electrolyte membrane-catalyst layer assembly obtained as described above was joined with the two gas diffusion layer sheets so that the assembly was sandwiched between the two sheets with their water-repellent layers disposed inward. Then, separators (made of carbon, with serpentine gas channel grooves) were provided on the outer sides of the gas diffusion layers, and were fixed thereto with 800 N, thus obtaining a fuel cell cell of the first example.

The electrochemical surface area of the platinum nanoparticle in the anode-side catalyst layer of the fuel cell cell obtained as described above was measured to be 28.5 $m^2/g$.

Next, the manufacture of a fuel cell cell in a second example of the invention will be described.

The catalyst ink A prepared in the first example was sprayed to one side surface of an electrolyte membrane (name of component: perfluorocarbon sulfonic acid, by Confidential, 50 μm in membrane thickness) so that the amount of platinum nanoparticle became equal to 0.3 mg/cm$^2$, and then was dried under reduced pressure under a temperature condition of 40° C. or lower. Thus, a cathode-side catalyst layer (3 μm in membrane thickness). On the surface opposite from the electrolyte membrane, an anode-side catalyst layer was formed in the same manner as in the first comparative example below. In this manner, a catalyst layer-electrolyte membrane-catalyst layer assembly was formed.

Using the obtained catalyst layer-electrolyte membrane-catalyst layer assembly, a fuel cell cell of the second example was manufactured as in the first example. The electrochemical surface area of the platinum nanoparticle in the cathode-side catalyst layer of the fuel cell cell of the second example was measured to be 43.0 m$^2$/g.

Next, the manufacture of a fuel cell cell of the first comparative example will be described.

A catalyst ink B was prepared by mixing and dispersing 1.5 g of a carbon black (50 μm in particle diameter) supporting 45 wt % of a platinum black of 2 nm in primary particle diameter, 4.7 g of a perfluorocarbon sulfonic acid resin solution (trade name: Nafion DE1020, by DuPont, containing 11 wt % perfluorocarbon sulfonic acid resin), and 16 g of water, though the use of a bead mill.

The obtained catalyst ink B was applied to a polytetrafluoroethylene sheet by a doctor blade method, thus manufacturing a transfer sheet. Using the obtained transfer sheets, catalyst layers are thermally transferred to both side surfaces of an electrolyte membrane (name of component: perfluorocarbon sulfonic acid, by Confidential, 50 μm in membrane thickness), whereby a catalyst layer-electrolyte membrane-catalyst layer assembly was formed. The amounts of platinum in the catalyst layers (3.6 cm×3.6 cm) were 0.4 mg/cm$^2$ on the cathode side, and 0.2 mg/cm$^2$ on the anode side.

Two gas diffusion layer sheets were manufactured as in the first example. Using the two gas diffusion layer sheets and the catalyst layer-electrolyte membrane-catalyst layer assembly obtained as described above, a fuel cell cell of the first comparative example was obtained by substantially the same method as in the first example.

The electrochemical surface area of the platinum particle in the cathode-side catalyst layer of the fuel cell cell obtained as described above was measured to be 55 m$^2$/g.

Next, the cell voltage behavior at the time of hydrogen-lack operation will be described.

With regard to the obtained cells of the first example and the first comparative example, the cell voltage at the time of hydrogen-lack operation was measured in a condition where a nitrogen gas (amount of flow: 500 mL/min, humidification temperature: 70° C.) was passed to the fuel electrode side, and air (amount of flow: 1000 mL/min, humidification temperature: 70° C.) was passed to the oxidant electrode side to establish a hydrogen-lack state, and the current density was 0.2 A/cm$^2$. Results are shown in FIG. 4.

Figure 4:
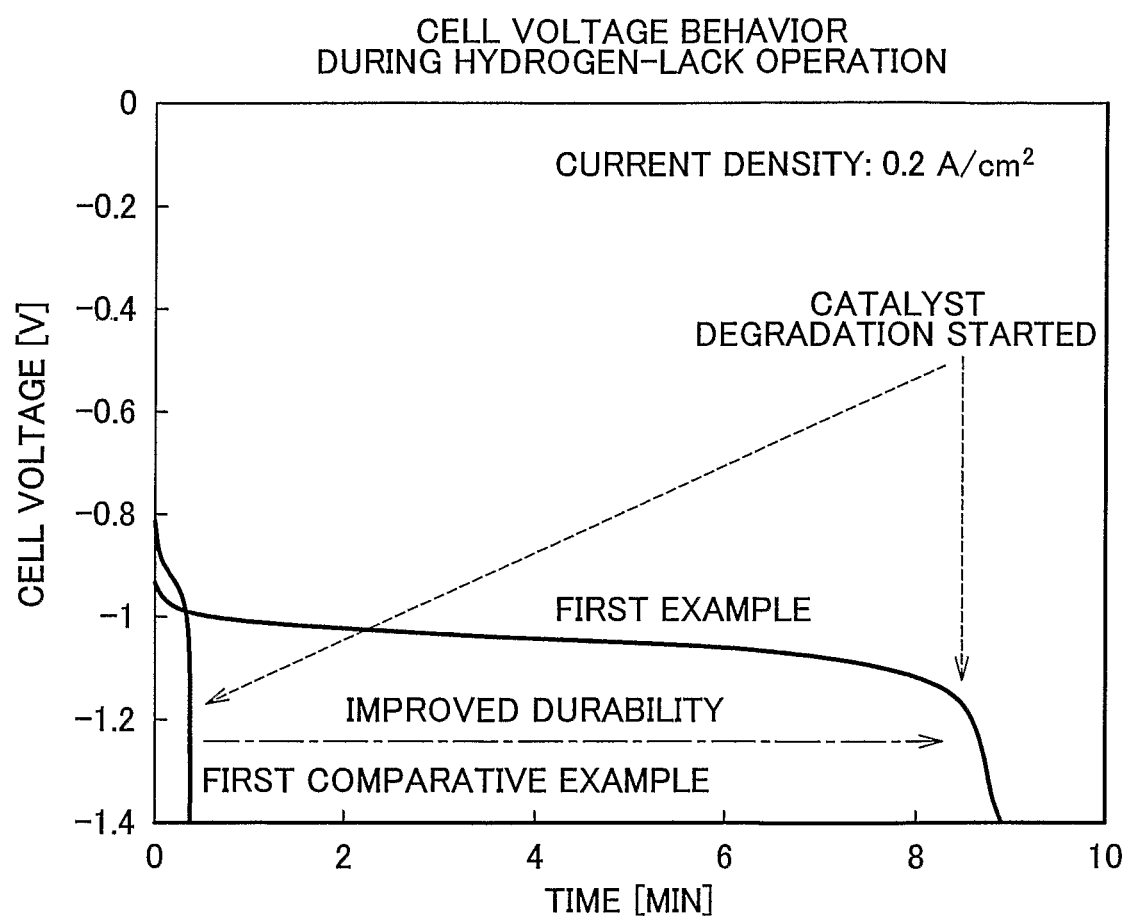
FIG. 4 is a diagram showing results of the cell voltage measurement during the hydrogen-lack operation in a first example and a first comparative example.

As can be understood from FIG. 4, as for the cell of the first comparative example, at the elapse of about 20 seconds, the oxidation corrosion of the carbon supporting the catalyst (platinum) started, and the catalyst degradation started to progress, and the cell voltage sharply dropped. On the other hand, as for the cell of the first example incorporating the fuel cell membrane-electrode assembly of the invention having a non-supported-catalyst containing layer at the fuel electrode side (anode side), the catalyst degradation did not occur even after the elapse of 8 minutes, exhibiting at least 24 times the durability of the first comparative example.

Next, the influence of the abnormal potential at the oxidant electrode side on the cell characteristics will be described.

Figure 5:
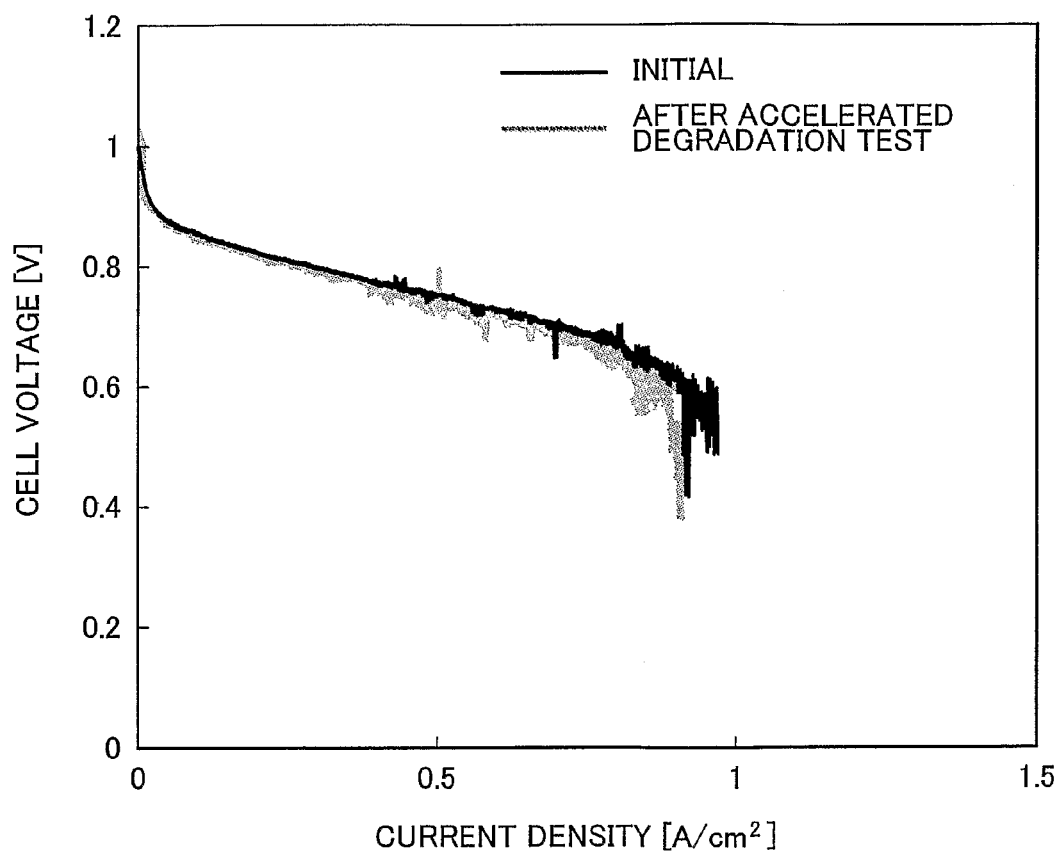
FIG. 5 is a diagram showing the cell characteristics of a second example.

With regard to the obtained cells of the second example and the first comparative example, the initial cell characteristics (cell voltage, current density) were measured in an ordinary electric power generation condition. Next, the oxidant electrode (cathode) was subjected to an accelerated degradation test in which high electric potential was applied for a predetermined time. After that, post-accelerated degradation test cell characteristics of the cells were measured in an ordinary electric power generation condition. Results are shown in FIG. 5 (second example) and FIG. 6 (first comparative example). The ordinary electric power generation condition and the accelerated degradation test condition are as follows.

Figure 6:
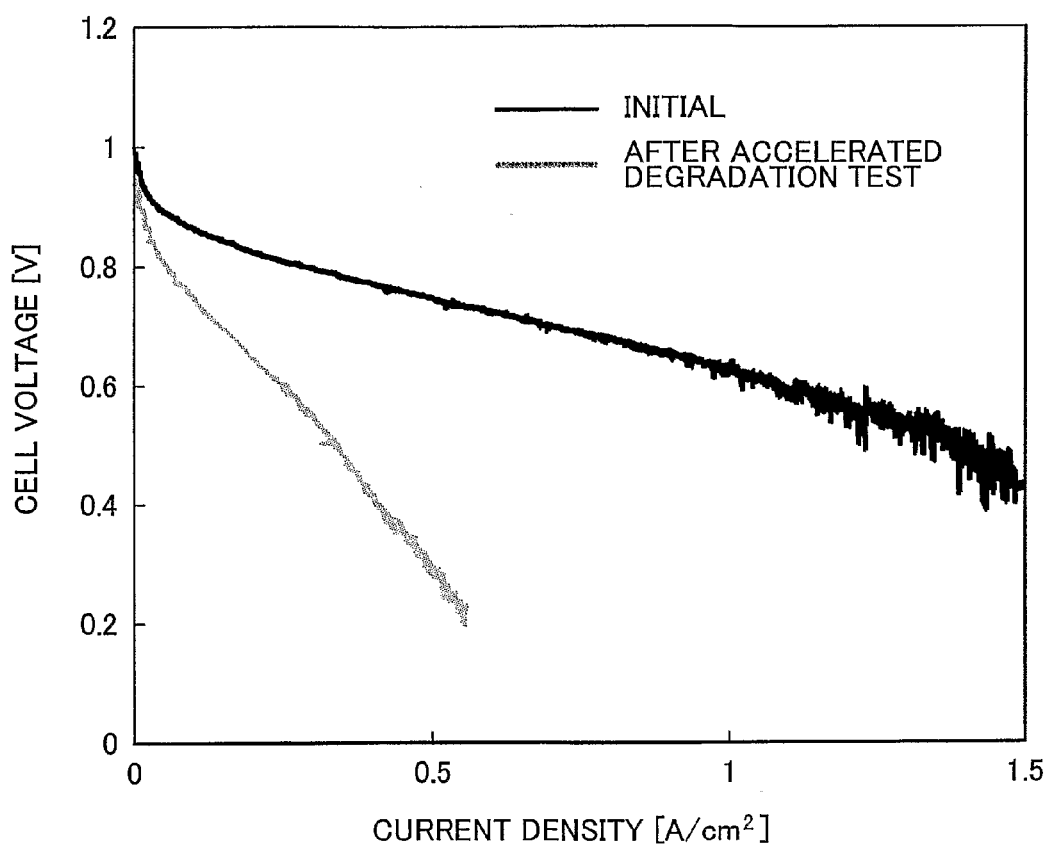
FIG. 6 is a diagram showing the cell characteristics of the first comparative example.

(Ordinary Electric Power Generation Condition)
Hydrogen gas: amount of flow of 300 mL/min, humidification temperature of 80° C.
Air: amount of flow of 1000 mL/min, humidification temperature of 80° C.
Cell temperature: 80° C.
Back pressure: 200 kPa
(Accelerated Degradation Test Condition)
Hydrogen gas: amount of flow of 500 mL/min, humidification temperature of 80° C.
Air: amount of flow of 500 mL/min, humidification temperature of 80° C.
Load electric potential: 1.5 V
Electric potential application time: 3 minutes
Cell temperature: 80° C.
Back pressure: 100 kPa As shown in FIG. 6, as for the cell of the first comparative example, the post-accelerated degradation test cell characteristics greatly declined from the initial cell characteristics. Thus, great catalyst degradation occurred due to the accelerated degradation test in which an abnormal electric potential was applied to the oxidant electrode.

On the other hand, as for the cell of the second example incorporating the fuel cell membrane-electrode assembly of the invention having a non-supported-catalyst containing layer at the oxidant electrode side (cathode side), there was not much difference between the initial cell characteristics and the post-accelerated degradation test cell characteristics as shown in FIG. 5. Thus, the cell of the second example exhibited excellent resistance to an abnormally high potential state in the oxidant electrode.

While the invention has been described with reference to embodiments thereof, it is to be understood that the invention is not limited to the embodiments or constructions. To the contrary, the invention is intended to cover various modifications and equivalent arrangements. In addition, while the various elements of the embodiments are shown in various combinations and configurations, which are exemplary, other combinations and configurations, including more, less or only a single element, are also within the spirit and scope of the invention.

The invention claimed is:
1. A fuel cell membrane-electrode assembly comprising:
an electrolyte membrane;
a fuel electrode provided at one surface side of the electrolyte membrane; and
an oxidant electrode provided at another surface side of the electrolyte membrane,
wherein at least one of the fuel electrode and the oxidant electrode has a non-supported-catalyst containing catalyst layer that contains:

a metal catalyst nanoparticle of 0.3 nm to 100 nm in primary particle diameter that is not supported on a support, and an electrochemically active surface area of the metal catalyst nanoparticle is 10 m$^2$/g to 150 m$^2$/g, and a layer thickness of the non-supported-catalyst containing catalyst layer is less than or equal to 10 μm, wherein the metal catalyst nanoparticle is highly dispersed and restrained from aggregating, and wherein the non-supported-catalyst containing catalyst layer further contains a carbon particle that is a water-repellent particle and that has surface area of 5 to 50 m$^2$/g.

2. The fuel cell membrane-electrode assembly according to claim 1, wherein the primary particle diameter of the metal catalyst nanoparticle is 5 nm to 10 nm.

3. The fuel cell membrane-electrode assembly according to claim 1, wherein the layer thickness of the non-supported-catalyst containing catalyst layer is less than or equal to 5 μm.

4. The fuel cell membrane-electrode assembly according to claim 1, wherein the metal catalyst nanoparticle is a platinum particle.

5. The fuel cell membrane-electrode assembly according to claim 1, wherein the carbon particle that is a water repellent particle is a highly crystallized carbon.

6. The fuel cell membrane-electrode assembly according to claim 1, wherein an amount of the metal catalyst nanoparticle per unit area of the non-supported-catalyst containing catalyst layer is 0.001 to 10 mg/cm$^2$.

7. The fuel cell membrane-electrode assembly according to 1, wherein the non-supported-catalyst containing catalyst layer further contains an electrolyte resin.

8. The fuel cell membrane-electrode assembly according to 1, wherein at least one of the fuel electrode and the oxidant electrode comprises a catalyst layer having a multi-layer structure in which a first catalyst layer made of the non-supported-catalyst containing catalyst layer, and a second catalyst layer that contains an electrolyte resin and a supported catalyst particle formed by supporting a catalyst on a carbon particle whose surface area is 5 to 200 m$^2$/g, in that order from a side of the electrolyte membrane.

9. The fuel cell membrane-electrode assembly according to claim 8, wherein the layer thickness of the second catalyst layer is less than or equal to 50 μm.

10. The fuel cell membrane-electrode assembly according to claim 8, wherein the amount of catalyst per unit area of the second catalyst layer is 0.001 to 0.5 mg/cm$^2$.

11. The fuel cell membrane-electrode assembly according to claim 8, wherein the amount of catalyst per unit area of the entire catalyst layer that includes the first catalyst layer and the second catalyst layer is 0.001 to 10 mg/cm$^2$.

12. The fuel cell membrane-electrode assembly according to 1, wherein a bulk density of the metal catalyst nanoparticle is 0.1 g/cm$^3$ to 21.37 g/cm$^3$.

13. The fuel cell membrane-electrode assembly of claim 1, wherein a secondary particle diameter distribution of the metal catalyst nanoparticle in the catalyst ink is D90≤3 μm.

* * * * *